(12) United States Patent
Ascari et al.

(10) Patent No.: US 8,401,825 B2
(45) Date of Patent: Mar. 19, 2013

(54) METHODS AND SYSTEMS FOR DATA PROCESSING AND THEIR APPLICATIONS

(75) Inventors: Luca Ascari, Parma (IT); Ulisse Bertocchi, Montignoso (IT); Paolo Corradi, Reggio Emilia (IT); Cecilia Laschi, Follonica (IT); Paolo Dario, Livorno (IT); Jonas Ambeck-Madsen, Brussels (BE); Hiromichi Yanagihara, Tokyo (JP)

(73) Assignee: Toyota Motor Europe NV, Brussels (BE)

( * ) Notice: Subject to any disclaimer, the term of this patent is extended or adjusted under 35 U.S.C. 154(b) by 410 days.

(21) Appl. No.: 12/675,650

(22) PCT Filed: Aug. 28, 2008

(86) PCT No.: PCT/EP2008/061339
§ 371 (c)(1),
(2), (4) Date: Feb. 26, 2010

(87) PCT Pub. No.: WO2009/027486
PCT Pub. Date: Mar. 5, 2009

(65) Prior Publication Data
US 2010/0235145 A1    Sep. 16, 2010

(30) Foreign Application Priority Data
Aug. 28, 2007   (EP) .................................. 07075725

(51) Int. Cl.
*G06F 11/00* (2006.01)
(52) U.S. Cl. ...................................................... 702/190
(58) Field of Classification Search .................. 702/190, 702/117, 118, 182–185, 188
See application file for complete search history.

(56) References Cited

U.S. PATENT DOCUMENTS
2007/0147673 A1   6/2007   Crandall
2007/0265866 A1*  11/2007  Fehling et al. .................... 705/1

FOREIGN PATENT DOCUMENTS
EP   0 223 483 A2   5/1987
JP   06-131040 A    5/1994

OTHER PUBLICATIONS
International Preliminary Report on Patentability regarding PCT/EP2008/061339, Dec. 15, 2009.

\* cited by examiner

*Primary Examiner* — Edward Raymond
(74) *Attorney, Agent, or Firm* — Bacon & Thomas, PLLC

(57) ABSTRACT

A method (400) of processing signal outputs of a plurality of topologically distinct sensors in response to stimuli is described. The method comprises obtaining (402) a plurality of temporal sensor outputs in parallel. Thereafter, features are extracted (406), the features having dynamic behavior pattern. The extraction is performed in a topology consistent way by arithmetic processing in parallel of neighboring temporal sensor outputs. Furthermore, a quality of the extracted features is being determined.

25 Claims, 13 Drawing Sheets

METHODS AND SYSTEMS FOR DATA PROCESSING AND THEIR APPLICATIONS

TECHNICAL FIELD OF THE INVENTION

The present invention relates to the field of data processing. More particularly, the present invention relates to methods and systems for data processing as well as to their application in computerised systems in general, such as robotics and vehicles/automobiles in particular.

BACKGROUND OF THE INVENTION

Applications of robotics are widely spread. Robots often are complex and sophisticated systems requiring high computational power. Whereas current robots for automation are often very high performance and reliable machines, they still are hardly capable of sharing most everyday life tasks with humans, specially in terms of autonomous behaviour and of user-friendly human-machine interfaces. More particularly, they are hardly capable of manipulation or interaction with unknown or unpredictable objects or living beings.

Examples of everyday life tasks that have received much attention for many years from both neuro-physiological and robotics communities are grasp and lift tasks. Two aspects are crucial for a stable grasp: the ability of the hardware and software system to avoid object slip and the ability to control in real-time the grasping force. Neuro-physiological studies allowed a deep understanding of these two aspects in humans, analysing grasping in its simplest configuration, i.e. in which an object is grasped between the opposed thumb and index fingers and lifted. The role of skin mechanoreceptors during grasp, the mechanisms of motor coordination as well as the strategies used in humans to avoid object slip were widely investigated. In particular, it was shown that the adaptation of the grip force (the grasping force) to the friction between the skin and the object takes place in the first 0.1 s after the initial contact. It furthermore has been found that, after lifting of the object, secondary adjustments of the force balance can occur in response to small short-lasting slips, revealed as vibrations (detected mainly by Pacinian corpuscles).

The concept of incipient slippage was introduced to indicate the micro-vibrations in the peripheral regions of the contact area that appear just before macroscopic slip occurs. The detection of such small vibrations is one of the main methods used to assure grasp stability in robotic grasping. One proposed solution was to use dynamic sensors (e.g. piezoelectric strips) to detect incipient slippage, another was based on measurement of the friction coefficient between the object and fingers.

Slip detection may be based on frequency content analysis on outputs of a sensor array or e.g. on the combined use of strain sensitive sensors and artificial neural networks. Another proposed solution is to use a fuzzy-based controller: the inputs to the controller are relative velocity and acceleration between object and fingers, as well as the frequency content of the force distribution on the capacitive sensor array obtained through fast Fourier transform (FFT) analysis, while its output is the closing speeds of the fingers. The main drawbacks of these methods are their high computational requirements, which make them unsuitable for real-time hand control and rapid reactions if the number of sensors is high.

Recently, incipient slip was detected through vision based analysis of the deformation of the fingertip. From the side of dextrous manipulation control, it was proposed to use dynamic sensing (PVDF strips) to detect tactile events, such as onset or offset of contact between finger and object, or micro-vibrations during the onset of a slip event, or external perturbations, associated with transitions between specific phases of the manipulation task, thus introducing an event-driven grasp controller.

For an artificial tactile system to be useful not only in robotic grasping but more in general for manipulation and human-robot interaction purposes, the localization of the stimulus is a must, thus making a dense and diffused array of tactile sensors essential.

Whereas significant progress has been made in the last years in the fabrication and miniaturization of tactile sensors and sensors arrays, implementing these in robotics for manipulation and/or human—robot interaction purposes and its corresponding challenges is still to a large extent unsolved. Slip detection is only one example of problems with sensors arrays that need to be addressed.

SUMMARY OF THE INVENTION

It is an object of the present invention to provide good apparatus or methods for processing signals such as sensor output data, as well as to provide good computerized systems, such as robots, using such methods and systems for processing signals. It is an advantage of embodiments according to the present invention that data processing of sensor output signals can be performed efficiently, resulting in systems useful for human-robot interaction and/or machine perception purposes in real time. The system may be useful for active perception and/or passive perception. Manipulation by a robot is one example of a process that can be used in human-robot interaction. Manipulation information may be tactile information.

The above objective is accomplished by a method and device according to the present invention.

The present invention relates to a method of processing signal outputs of a plurality of topologically distinct sensors in response to mechanical stimuli, the method comprising obtaining a plurality of topologically arranged temporal sensor outputs in parallel, extracting features with a dynamic behaviour pattern by arithmetic processing in parallel of neighbouring temporal sensor outputs e.g. in a topology consistent way, and a quality of the extracted features being determined. The mechanical sensors may be analog sensors. It is an advantage that an efficient system is obtained. It is an advantage of embodiments according to the present invention that systems can be obtained that are able to use information from a potentially very large number of sensing elements to provide in real-time manipulation, such as e.g. stable grasp, with minimal manipulation forces of unknown objects, e.g. having unknown shape, weight, friction and surface texture.

Obtaining a plurality of temporal sensor outputs in parallel may comprise sampling a plurality of sensor outputs in time to generate the temporal sensor outputs.

The temporal sensor outputs may be sensor outputs from mechanical sensors.

Arithmetic processing may comprise processing said neighbouring temporal sensor outputs in the temporal domain. The arithmetic processing may be processing without Fourier Analysis. The latter results in a faster system.

The method may comprise arranging the extracted features in a topology maintaining array or arrays. It is an advantage of embodiments according to the present invention that these provide a processor that is based on recognition of significant manipulation events, such as e.g. significant tactile events or events wherein objects undergo a specific, e.g. sudden, movement. It is also an advantage of embodiments according to the present invention that systems as described above can, at the same time, be robust against failures of isolated or subsets of sensors.

The method may be adapted for processing said sensor outputs for improving active or passive perception of events or features occurring in the environment.

The present invention also relates to the use of a method for processing as described above, in automotive industry, automotive systems, automotive sensor systems or automotive processing systems.

Said extracting and arranging may comprise recognising features in sensor outputs and preserving their spatial localisation.

The method further may comprise spatially filtering or spatio-temporal filtering of the array or arrays.

The spatial filtering or spatio-temporal filtering may be adapted for deriving actions to be taken by a controller for controlling a carrier substrate of the plurality of sensors.

The spatially filtering may comprise extraction of an event based on a plurality of neighbouring extracted features in said topology maintaining array or arrays.

The event may be manipulation by a computerised system, such as e.g. a robot, with a plurality of sensor outputs of an object, such as e.g. grasping of an object. The event may be the movement or the intention of a movement of an object in a field of view. More generally it may be an action related to perception of the environment of the computerised system. The neighbouring extracted features may be indicative of a blob, i.e. contact between a plurality of neighbouring sensors and the object or activation or increased sensing of a plurality of neighbouring sensors.

The arithmetic processing may comprise applying a bandpass filter or a combination of bandpass filters for temporal feature extraction.

The arithmetic processing may comprise using a cellular neural network or a cellular non-linear network.

The cellular neural network or cellular non-linear network may be non-learning. It is an advantage of embodiments according to the present invention that Fourier transform analysis can be avoided, resulting in an efficient system, e.g. capable of processing a large amount of signals in parallel. It is an advantage of embodiments according to the present invention that they provide a parallel data processing architecture based on a cellular non-linear network (CNN) paradigm. The latter advantageously may allow design and implementation of brain-like parallel algorithms.

The arithmetic processing may comprise only adding, subtracting, delaying, thresholding and logical functions. It is an advantage of embodiments according to the present invention that Fourier transform analysis can be avoided, resulting in an efficient system, e.g. capable of processing a large amount of signals in parallel.

The arithmetic processing may comprise applying a filter having a single filter input signal and resulting in multiple filter output signal and wherein each filter output signal is based on the subtraction of a modified input signal from an original input signal.

Arithmetic processing in parallel of neighbouring temporal sensor outputs may comprise arithmetic processing in parallel of only part of the neighbouring temporal sensor outputs.

The number of neighbouring temporal sensor output data may be limited to less than 50% of the number of sensor outputs available. This may be user-determined.

The feature with dynamic behaviour may comprise a feature indicating any of a variation, vibration and/or oscillation. A variation thereby may be a change in intensity by at least a predetermine threshold in a predetermined period. An oscillation thereby may be a sequence of two variations of opposite sign (and independent user-determined amplitude) in the same predetermined period. A vibration may be a sequence of at least two oscillation in two subsequent periods of time.

The quality of the extracted features may comprise a stability of the dynamic behaviour among a plurality of neighbours. A stability may be a consistency of occurrence of the dynamic behaviour pattern among a plurality of neighbours.

The present invention also relates to a method for controlling a computerised system comprising at least one movable element comprising a plurality of topologically distinct sensors, the method comprising measuring a plurality of topologically arranged output signals, e.g. from sensors which may be for example mechanical sensors or optical sensors, processing said plurality of output signals using a method as described above and controlling said at least one movable element based on said determined quality of the extracted features.

The present invention furthermore relates to a data processor for processing signal outputs of a plurality of topologically distinct sensors in response to mechanical stimuli, the processor comprising an input means for receiving a plurality of topologically arranged temporal sensor outputs in parallel, a feature extracting means for extracting features with a dynamical behaviour pattern, the feature extracting means comprising an arithmetic processor for arithmetic processing in parallel neighbouring temporal samples of the sensor outputs e.g. in a topology consistent way, and a determination means for determining a quality of the extracted features. It is an advantage of embodiments according to the present invention that these provide efficient information extraction, thus e.g. allowing the use of a large number of sensors. It is an advantage of embodiments according to the present invention that control of computerised systems using a large number of sensing elements, such as robots or e.g. more particularly robotic hands, in real time operations, such as grasping and lifting, can be obtained.

The input means for receiving a plurality of temporal sensor outputs in parallel may comprise a sampling means for sampling a plurality of sensor outputs in time to generate the temporal sensor outputs.

The arithmetic processor may be adapted for arithmetic processing of said neighbouring temporal sensor outputs in the temporal domain.

The data processor furthermore may be adapted for arranging the extracted features in a topology maintaining array or arrays.

The data processor may be adapted for recognising features in sensor outputs and preserving their spatial localisation.

The processor may comprise a filter for spatially or spatio-temporal filtering of the array or arrays.

The filter may comprise filtering means for extraction of an event based on a plurality of neighbouring extracted features in said topology maintaining array or arrays.

The arithmetic processor may comprise a bandpass filter or a combination of bandpass filters for extracting temporal features.

The arithmetic processor may comprise a cellular neural network or a cellular non-linear network.

The arithmetic processor may comprise a filter based on only subtracting, delaying, thresholding, logical and/or morphological functions.

The arithmetic processor may comprise a filter having a single filter input signal and resulting in multiple filter output signal and wherein each filter output signal is based on the subtraction of a modified input signal from an original input signal.

The arithmetic processor for processing in parallel neighbouring temporal sensor outputs may be an arithmetic processor for arithmetic processing in parallel only part of the neighbouring temporal sensor outputs.

The dynamic behaviour may comprise any of a variation, vibration and/or oscillation.

The quality of the extracted features may comprise a stability of the dynamic behaviour among a plurality of neighbours.

The present invention also relates to a computerised system comprising at least one movable element comprising a plurality of topologically distinct mechanical sensors, and a data processor as described above.

The system further may comprise a controller for controlling the at least one moveable element as function of the obtained quality of the extracted features.

The present invention furthermore relates to a computer program product for processing signal outputs of a plurality of topologically distinct mechanical sensors in response to mechanical stimuli, the computer program product, when executed on a computer, adapted for executing a method as described above.

The present invention also relates to a machine-readable data storage device storing the computer program product as described above and/or to the transmission of such a computer program product over a local or wide area telecommunications network.

It is an advantage of embodiments according to the present invention that systems with an appropriate sensory-motor coordination can be obtained.

It is an advantage of embodiments according to the present invention that repeated manipulation tasks can be performed in a stable and successful way. For example, for repeated pick and lift tasks, embodiments of the present invention were able to guarantee stable grasp and recognition of the onset of slippage with common objects like plastic bottles, as well as with deformable objects like soft sponge balls and even extremely slippery, deformable, and delicate objects, such as Japanese tofu.

It is an advantage of some embodiments according to the present invention that data processors and computerised systems can be obtained that are able to deal with many analog signals, adjusting in real time the manipulation force, e.g. grasp force, and keeping it at low, e.g. minimum, required values.

Particular and preferred aspects of the invention are set out in the accompanying independent and dependent claims. Features from the dependent claims may be combined with features of the independent claims and with features of other dependent claims as appropriate and not merely as explicitly set out in the claims.

The teachings of the present invention permit, amongst others, the design of improved computerised systems such as for example robots or vehicles/automobiles and corresponding methods such as for example methods for providing human-robot interaction, methods for providing robotic manipulation or methods for exploiting machine perception.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
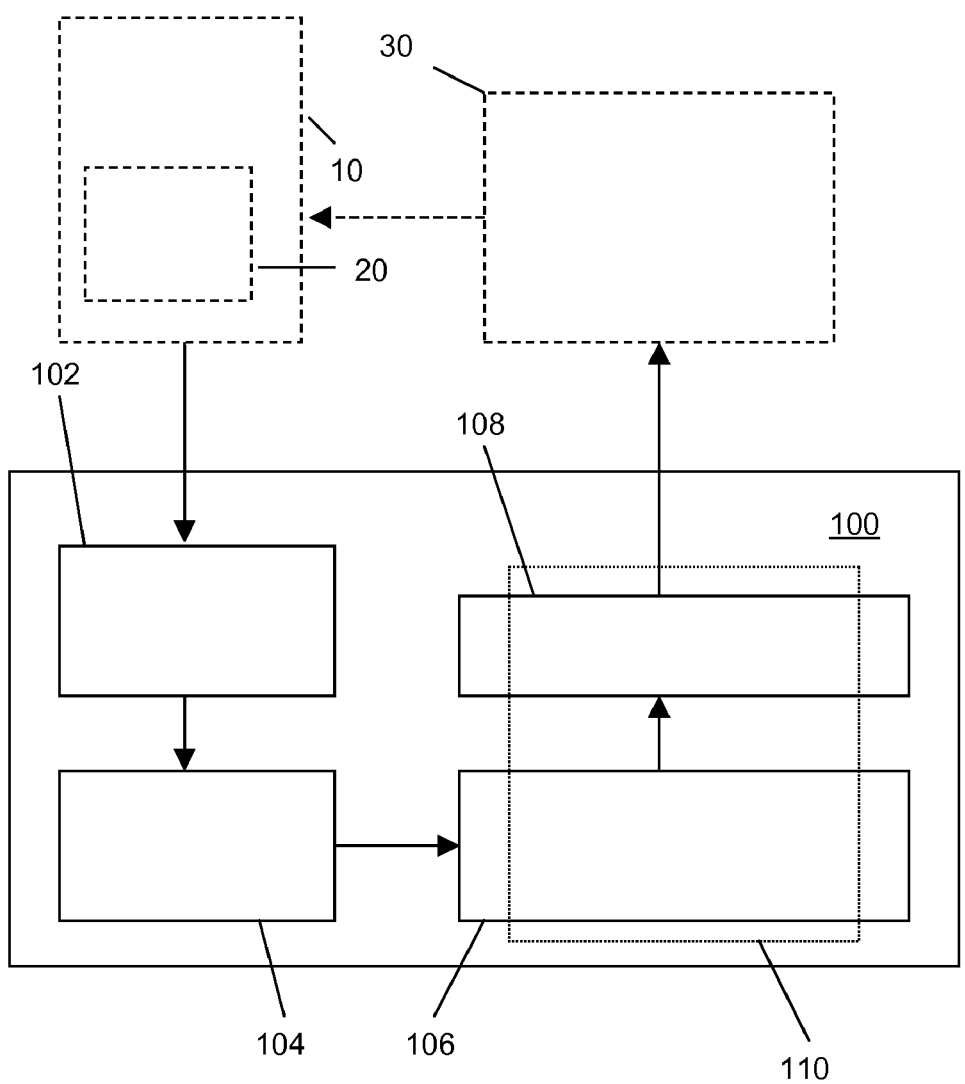
FIG. 1 is a schematic representation of a data processor and related components, according to an embodiment of the first aspect of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. Moreover, the terms top, bottom, over, under and the like in the description are used for descriptive purposes and not necessarily for describing relative positions. It is to be understood that the terms so used are interchangeable under appropriate circumstances and that the embodiments of the invention described herein are capable of operation in other sequences or orientations than described or illustrated herein.

It is to be noticed that the term "comprising", used in the claims, should not be interpreted as being restricted to the means listed thereafter; it does not exclude other elements or steps. Similarly, it is to be noticed that the term "coupled", should not be interpreted as being restricted to direct connections only. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. Furthermore, while some embodiments described herein include some but not other features included in other embodiments, combinations of features of different embodiments are meant to be within the scope of the invention, and form different embodiments, as would be understood by those in the art.

In the description provided herein, numerous specific details are set forth. However, it is understood that embodiments of the invention may be practiced without these specific details. In other instances, well-known methods, structures and techniques have not been shown in detail in order not to obscure an understanding of this description.

The terms "data processor" and "data processing means" may be interchanged in the present application and both refer to the component adapted for processing the data or signals. The term "processor" or "processing means" may be interchanged in the present application and both refer to a component adapted for processing, e.g. signals. The term "input means" or "input data receiver" may be interchanged in the present application and thus both refer to the component adapted for receiving the input signals. The terms "sampler" and "sampling means", as well as "feature extractor" and "feature extracting means" and "quality determinator" and "quality determination means" respectively may be interchanged in the present application. Unless specifically stated otherwise, as apparent from the following discussions, it is appreciated that throughout the specification discussions utilizing terms such as "ascertaining," "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

The term "real-time" may be used for processes that proceed at a given and predictable rate that matches that of the real world process. In particular it may refer to a detection of an event within a predetermined maximum latency corresponding with real world events ant the rate at which the computation proceeds may be high enough to assure quick response.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

In a first aspect, the present invention relates to a data processor for processing outputs of a plurality of topologically distinct sensors, such as for example mechanical sensors, e.g. pressure, force or acoustic sensors; electromagnetic sensors such as e.g. optical sensors, magnetic sensors, etc. The data processor may be particularly suitable for sensors providing a sensor output as response to mechanical stimuli. Mechanical stimuli thereby may be movement of an object, a change in pressure by an object, etc. Such mechanical stimuli may, in agreement with the sensors indicated above, be sensed in an optical way, in a way using pressure or force, in an acoustic way, using electromagnetic interaction, using magnetic interaction, etc. In some embodiments, the object does not need to be or come in direct physical contact with the sensor in order to sense the mechanical stimuli. In other advantageous embodiments, the object is or comes in direct physical contact with the sensor or sensing surface. The data processor may be suitable for use in or with computerised systems, such as e.g. robots, computerised prosthetic devices such as a robotic arm or leg, machinery for use in manufacturing environments, but also in other computerised systems such as e.g. in transportation means such as automobiles, vehicles, . . . . Such computerised systems may comprises a plurality of sensors allowing machine perception and/or control of, interaction with and/or manipulation of objects, e.g.

unknown objects, making such computerised systems suitable for e.g. everyday tasks and/or system—human interaction.

By way of illustration, the present invention not limited thereby, standard and optional components of an exemplary data processor 100 are shown in FIG. 1. The data processor 100 may receive input signals from a computerised system 10, which may be a peripheral system, comprising a plurality of sensors 20, such as for example mechanical sensors, e.g. pressure, force or acoustic sensors electromagnetic sensors such as e.g. optical sensors, magnetic sensors, etc. The computerised system 10, which may be external to the data processor or in which the data processor may be integrated, may be controlled using a controller 30, adapted for generating control signals. Embodiments according to the present invention include or can be used, for example, in computerised systems, such as for example robotics for human-robot interaction, manipulation and/or control, humanoid robotics, as well as prosthetic devices, machinery for manufacturing purposes, but also for example in computerised systems in transportation means such as vehicles e.g. automobiles. Embodiments of the present invention may be especially suitable for computerised systems adapted for performing tactile events, such as lifting or grasping of objects or living beings. More generally, embodiments of the present invention may provide higher levels of machine perception or understanding, e.g. of the environment of the machine.

The data processor 100 comprises an input means 102, e.g. also referred to as data receiver, for receiving a plurality of sensor outputs. Preferably the plurality of sensor outputs, being input data for the data processor 100, may be obtained in parallel. The received sensor outputs may be any type of data or signals, such as e.g. electrical signals, optical signals, etc. An advantage of optical coded input is that it allows efficient receiving of data in parallel. These input signals may for example be one or more electrical sensor outputs per sensor that have been processed and converted into optical coded signals such as light pulses. In one example, the input means 102 may for example comprise an optical receiver, such as e.g. a CCD or C-MOS optical input layer, for receiving optical signals. The input signals thus may be obtained as optical signals, e.g. transferred via optical fibres such as plastic optical fibres, although the invention is not limited thereto. The input means 102 may be adapted for receiving the plurality of sensor outputs as optical signals, e.g. as an optical image whereby each pixel of the image could ideally correspond to one sensor signal on the computerised system, e.g. hand. Nevertheless, the implemented algorithms for controlling the system are resolution invariant such that also groups of pixels of the image may be representative of individual sensor outputs.

The number of input data or signals that may be obtained in parallel may be large, e.g. it may be more than 2, e.g. more than 5, or more than 8, or more than 16, or more than 32, or more than 50, or more than 100 or thousands. It is an advantage of embodiments according to the present invention that a large number of sensor outputs can be obtained simultaneously as this will assist in efficient processing of the signals. Furthermore, the latter will assist in detecting isolated malfunctioning detectors or detector arrays.

The input data may be received in a topologically consistent way, i.e. the relative geometrical positions of the received data on the input means 102 may replicate the relative position of the sensors that originate them. In some embodiments, the present invention not being limited thereto, there may be a homeomorphism between the sensor space and the pixel space. Two sensors close to each other in reality may have their projections onto the input means 102 close to each other. In some embodiments, if different types of sensors are used, the input data for each type of sensors may be received in a topologically consistent way. In some embodiments, a plurality of signal outputs may be extracted by each sensor and the geometry of sensor channels on the input means 102 may be chosen accordingly to the processing foreseen.

In some exemplary embodiments, the positions of the sensors and the positions of the received optical input, e.g. the position of the pixels when the input is received as image, advantageously are topologically consistent.

Figure 2A:
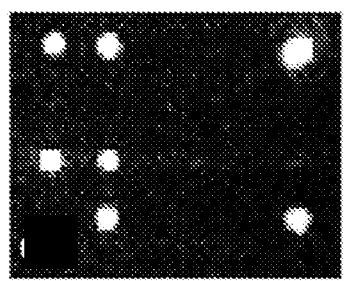
FIG. 2a and FIG. 2b illustrate exemplary optical coded input data as may be used in data processors according to embodiments of the present invention.
Figure 2B:
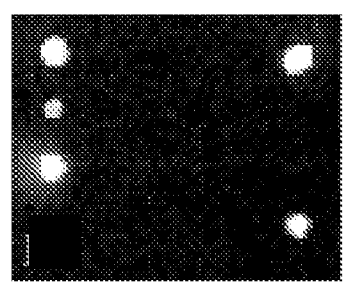

In one particular example the input means 102 is a 128×128 C-MOS optical input layer of a visual microprocessor, such as for example an ACE16K CNN visual microprocessor, used in an industrial PC. By way of illustration, the present invention not being limited thereto, two examples of input data as obtained in such a system are represented in FIG. 2a and FIG. 2b. The input data shown in these drawings illustrate input data for a robotic arm whereby 54 tactile optical signals are mapped on the 128×128 C-MOS optical input layer, for two different tactile images.

A Cellular non-linear Network (CNN), (or cellular neural network), is a n-dimensional array of identical dynamical systems (called cells) that interact directly within a finite local neighbourhood, and whose state variables are continuous valued signals. CNNs are a computation paradigm for problems reformulated as a well-defined task where the signal values are placed on a regular 2-D grid (e.g. image or array processing). Local CNN connectivity allows implementation as a VLSI (as in the ACE16K CNN visual microprocessor) or FPGA which can perform image processing based on local operations at a very high speed.

The data processor 100 furthermore may comprise a sampling means 104 for sampling the plurality of sensor outputs in time. In this way, temporal samples are generated. The sampling means 104 may be integrated to or separated from the input means 102. If e.g. the sensor output signals, which are the input signals for the data processor, are optically coded, the sampling may be performed by setting an integration time on the input means, then being an optical receiver. The sampling may e.g. be performed by controlling a shutter in an optical receiver. In this way, the obtained sensor data will become grey scale images. Nevertheless, other types of sampling, e.g. on other types of signals, also may be used. Sampling also may be performed at the peripheral part of the system, so that sampled signal outputs are received in the data processor. In some embodiments of the present invention, sampling may be performed both at the peripheral part of the system and in the data processor. For example, at the peripheral level tactile signals may be sampled in the skin modules and converted into light pulses and the data processor provides a second sampling. The data processor may be directly fed with analog signals, it does not need to convert into digital signals.

The data processor may comprise a shutter for appropriately filling or charging cells of the data processor with data signals. When optical signals are used for filling or charging cells of the data processor, as will be discussed in more detail below, the optical signals advantageously may be analog light signals, resulting in an more easy handling of the data by the data processor, compared to filling or charging using digital light signals, e.g. modulated by pulse width modulation.

The data processor 100 furthermore comprises a feature extracting means 106 for extracting features with a dynamical behaviour pattern. The dynamical behaviour pattern may be a dynamic behaviour that is specific for the manipulation task performed by the computerised system. The features may be any type of features that are characteristic for an event to occur during the manipulation. Such events may be for example slip, contact such as grasping or hitting, release of an object, movement of an object, rotation of an object, variation in a movement of an object, etc. The features characteristic for such events may be a change in the sensor signals, e.g. larger than a certain threshold. Such a change may be indicated as a variation. Other features may be the change of a sensor signal in a predetermined way, such as e.g. a modulation of the signal, (monotone) increase or decrease, a change fulfilling a predetermined function, etc. Other features that may be used can be oscillation or vibration, e.g. as described in more detail in one of the examples. By way of example, the present invention not being limited thereto, for the task of grasping and lifting dynamic behaviour pattern may be used referred to as variation, oscillation or vibration. For the task of detecting sudden movements of pedestrians or vehicles in traffic, variation, oscillation or vibration of parts of the object or of the full object can also be used. In addition to the features having a dynamic behaviour pattern, other features also may be used, such as for example area over which the sensor activation is spread, average intensity of the sensor signals, spreading of the sensor activation, etc.

The extraction of features with a dynamic behaviour pattern is performed by arithmetic processing in parallel of neighbouring temporal samples of the sensor outputs, e.g. in a topology consistent way. The feature extracting means 106 may be adapted for arithmetic processing of the neighbouring temporal samples in the temporal domain. The features with dynamic behaviour pattern advantageously may be extracted taking into account topology of the parallel processed samples of the sensor outputs. It may be adapted for processing without using Fourier transform analysis. Processing tasks of the feature extracting means 106 may be performed by an arithmetic processor 110, that may be dedicated to the feature extracting means 106 or commonly used by different components of the data processor 100. Different types of arithmetic processors may be used. For example in one embodiment the feature extracting means 106 may comprise an arithmetic processor 110 acting as or using a bandpass filter or a plurality of bandpass filters or a filter providing the function of a plurality of bandpass filters with different bands for temporal feature extraction. The feature extracting means 106 may comprise an arithmetic processor 110 comprising a cellular neural network or cellular non-linear network (CNN) as will be described in more detail below. The feature extracting means 106 may be adapted for acquiring all sensory input in parallel and process it in parallel. It furthermore may be adapted for processing these sensory input in parallel in the analog domain. The latter may be performed at high speed. The feature extracting means 106 may be adapted for extracting from the input stimulus features similar to those extracted by the human manipulation system using biologically inspired algorithms. The latter can be implemented in a computationally efficient way. The feature extracting means 106 furthermore may be adapted for taking into account functional aspects of the human sensory-motor coordination strategies. It is an advantage of embodiments according to the present invention that an efficient and robust biologically-inspired control algorithm is obtained. The method may also comprise extraction of features with a static behaviour pattern performed by arithmetic processing in parallel of neighbouring temporal samples of the sensor outputs.

The data processor 100 also comprises a quality determination means 108 for determining a quality of the extracted features. The quality of the extracted features may be for example a stability of the dynamic behaviour, an intensity of the dynamic behaviour, a consistency of the dynamic behaviour among a plurality of neighbouring data or a combination thereof. The stability thereby may be defined as the consistency of occurrence of the dynamic behaviour pattern over a plurality of time. These quality aspects may be evaluated with respect to a predetermined threshold. The data processor 100 thus may comprises processing capacity for determining a quality of the extracted features. The latter preferably may be performed by the same arithmetic processor 110 as the arithmetic processor used for feature extraction (as shown in FIG. 1), although the invention is not limited thereto, and a different arithmetic processor can be used. The determined quality of the extracted features may be used by an internal or external controller for controlling the computerised system. The determined quality of the extracted features also may be used to generate semantic information regarding the manipulation, whereby the semantic information is used by an internal or external controller for controlling the computerised system. The semantic information relates to information regarding the manipulation occurring in the real word. Semantic information may comprise information regarding the manipulation, such as e.g. slip, stable contact, a sudden tactile event, a change in direction of movement, a movement, a sudden movement, etc. The semantic information may be generated from the quality data using the arithmetic processor or using any other suitable processor. The generation of semantic information may also partly be based on proprioceptive information from the controller, e.g. resulting in higher level semantic information. Such proprioceptive information may be data generated by the computerised system and may be for example related to its joints position, like for example, when the computerised system is a robotic arm, the degree of closure of a hand and/or the height of the arm.

Figure 3:
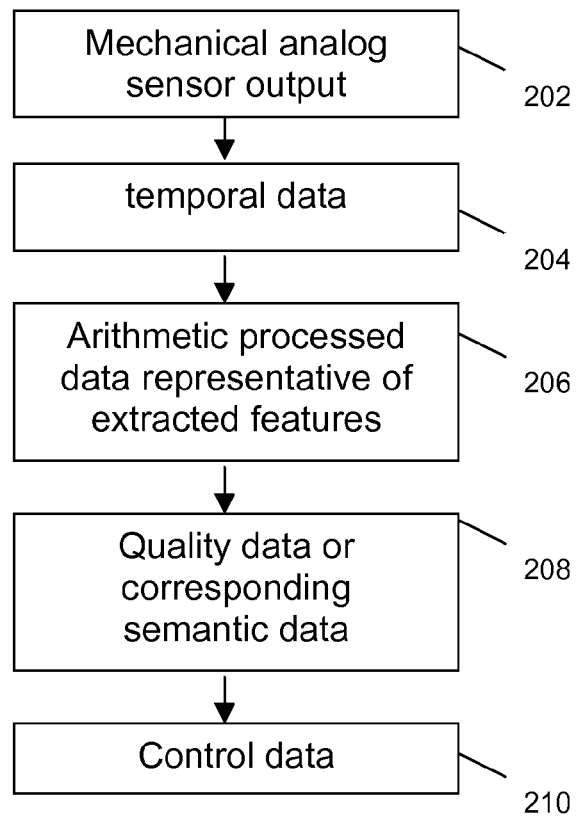
FIG. 3 is a schematic representation of a possible data flow in an exemplary data processor according to an embodiment of the present invention.
Figure 4:
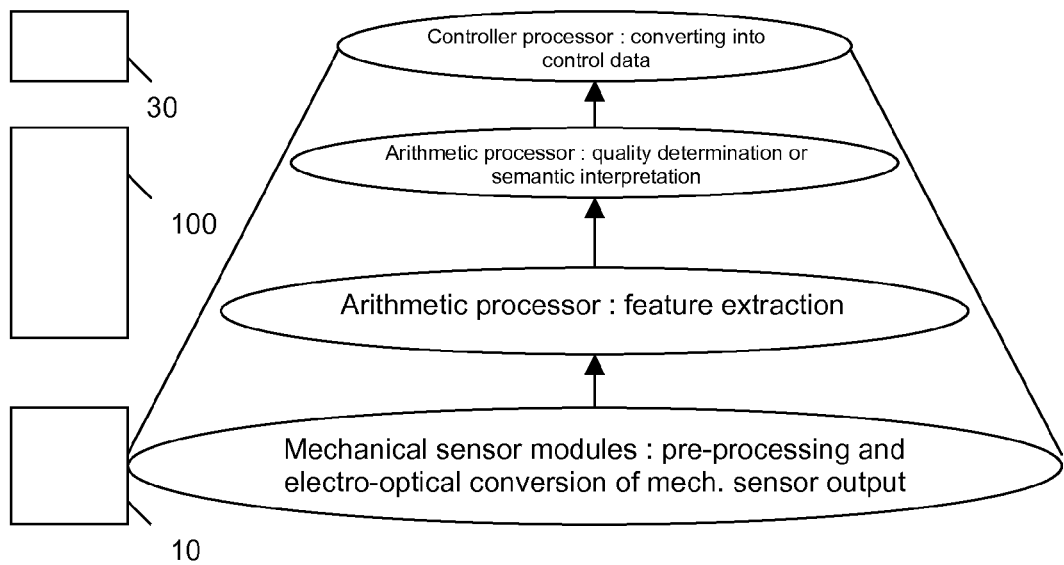
FIG. 4 is a schematic representation of the distribution of the different processing tasks performed in an exemplary data processor and the corresponding position where the processing is performed, according to an embodiment of the present invention.

By way of illustration, the present invention not being restricted thereby, an exemplary dataflow for the data received, handled and processed by the data processor 100 is shown in FIG. 3. The data processor 100 receives sensor output data 202, that may be pre-processed and/or converted signals. Such data is received from the peripheral system, e.g. from the sensors from the computerised system. Such signals may e.g. be optical signals representing tactile signals that are pre-processed and electro-optically converted. The sensor output data 202, which are input data for the data processor 100, are temporal data 204, optionally obtained by sampling of the input data for the data processor 100. Another example is that the input data is temporal data 204 obtained as continuous signals. The temporal data then are arithmetically processed resulting in a set of extracted features 206. The extracted features may be arranged in a topology maintaining array or arrays and extraction of features may therefore be performed taking into account topology of the sensor outputs. From the extracted features a quality of the extracted features 208 is obtained, corresponding with semantic information regarding the manipulation. An example of such semantic information may be a combination of a subset of features being indicative of slippage when contact was first established, as will be illustrated below. The quality of extracted features 208 or corresponding semantic information is then outputted to the controller for controlling the computerised system, where it may be transferred in control information 210. Such a controller may be internal to the data processor 100 or external to the data processor 100. By way of example, in FIG. 1, the controller is indicated as external to the data processor 100. The controller may combine the obtained information with proprioceptive information such as e.g. position signals from the computerised system. In this way, higher level semantic information may be generated. For example for a robotic hand, if slip is detected and contact was established, but in practice the hand is open, this is indicative of something being wrong. The different processing hardware levels at which the data is generated, handled and used are indicated in FIG. 4. The input data 202 are generated at the sensor modules, i.e. part of the computerised system 10, where pre-processing may be performed. Also electro-optical conversion of the sensor output may be performed, the latter depending on the type of signals that can be received by the data processor. Once received and optionally appropriately sampled by a sampler, the arithmetic processor processes the input date for extracting features and for determining a quality thereof. The arithmetic processor may be positioned in the data processor 100. Semantic data generated in the arithmetic processor may comprise the determined quality of the extracted features or comprise an interpretation of the quality. The quality data or semantic data then is transferred (outputted) to the controller processor, positioned in the controller 30, and may be processed into control data for controlling the computerised system.

In embodiments of the present invention, the data processor 100 may be adapted for storing the arithmetic processed signals in a topologically consistent way. The latter may e.g. be in a topological consistent array. In other words, the topology of the sensors on the computerised system 10 may not only correspond with the topology of the input data for the data processor 100, it further also may correspond with the topology of the processed signals after arithmetic processing of the signals. In other words, the extracted features may be arranged in a topologically consistent way corresponding with the topology of the sensors from which the input sensors are obtained. The extracted features may for example be stored in a topologically consistent array or arrays, topologically consistent with a position of the sensors used as input for the data processor. Topology may be taken into account, e.g. maintained, for the extraction of features having a dynamic behaviour pattern.

In embodiments of the present invention, the data processor 100 may be adapted for, besides extracting features with a dynamic behaviour pattern, also extract features with a spatial behaviour or with a particular intensity behaviour. In other words, the data processor 100 additionally may be adapted for obtaining spatial features like area and distribution of the sensors activated during the manipulation or intensity features like the average intensity of the activated sensor(s). These features may be, optionally after being processed, used together with the extracted features having a dynamic behaviour pattern for determining the quality of the extracted features or, for example, may be used for together with the quality of the extracted features, determining the semantic situation. For example, besides the extraction of features with a dynamic behaviour pattern by handling the sensor signals in parallel in the temporal domain, spatial filtering may be performed for extracting spatial information.

The data processor 100 may be adapted for determining or detecting manipulation events as well as detecting a quality of a feature or corresponding event, such as for example contact between the computerised system 10 and the object. The data processor 100 more generally may be adapted for determining or detecting perception events, e.g. with respect to environmental features of the computerised system.

Particular embodiments according to the first aspect of the present invention will be further described in more detail, the present invention not being limited thereby, but only by the claims.

Figure 5A:
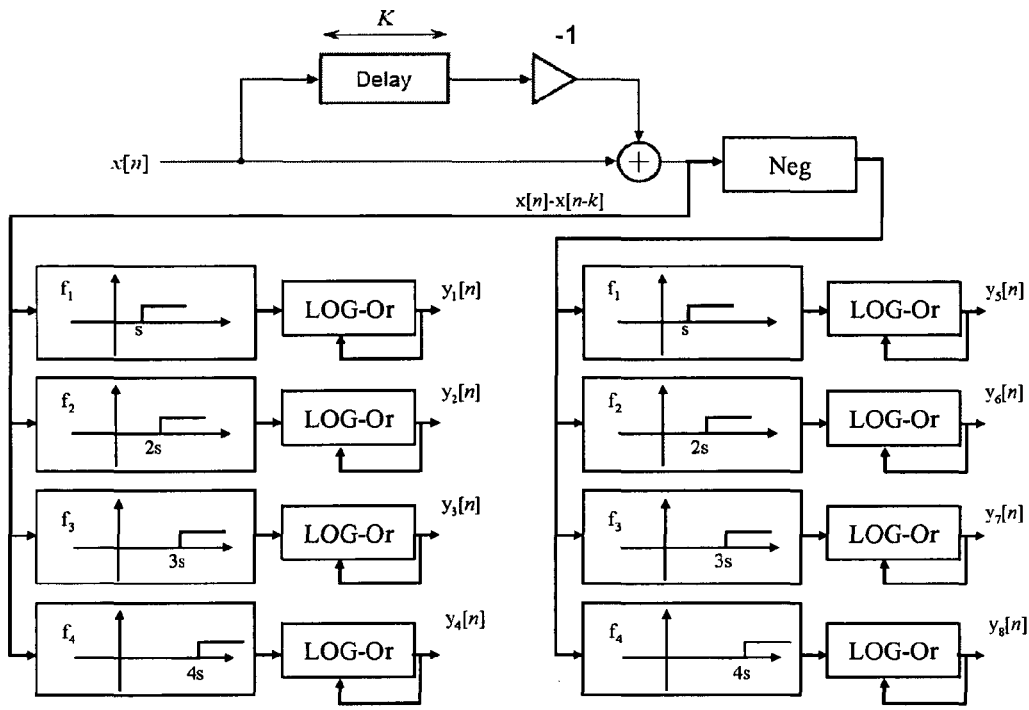
FIG. 5 is a schematic representation of a compact filter for detecting variations as can be used in a data processor according to a first particular embodiment of the present invention.

In a first particular embodiment, the present invention relates to a data processor 100 for processing signal outputs as described above, whereby at least the feature extracting means 106 is adapted with an arithmetic processor 110 for filtering the temporal samples of the input data using a bandpass filter or a combination of a number of bandpass filter or a filter providing the functionality of a combination of a number of bandpass filters with distinct bands that only operate in the temporal domain. The bandpass-filter(s) may be a spatial-temporal bandpass filter(s) only operating in the temporal domain. It may operate without Fourier transform. The bandpass filter(s) may be applied to each individual data signal received at each step in parallel. It may comprise a feedforward COMB filter. Contrary to a conventional comb filter, the signals may be subtracted. The bandpass filter(s) may comprise a temporal COMB filter, wherein at each time the output signal is a combination, e.g. subtraction, of only two signals, not of all previous samples in the window. The bandpass filter may be non-linear. It may comprise blocks of non linear functions. It may comprise logical operators and/or it may comprise morphological operators for denoising or other operations on the input signals. The bandpass filter(s) may comprise a combination of any or all of a feedforward COMB filter, blocks of non linear functions, logical operators and morphological operators for denoising. The bandpass filter(s) may comprise only functionality of subtracting, delaying, thresholding and applying logical functions. The latter limits the required computational power, and therefore advantageously allows a quicker operation time. The bandpass filter(s) may be single input, multiple output and each filter output signal may be based on the subtraction of a modified input signal from an original input signal. By way of illustration, the invention not limited thereby, an explicit structure of a filter that can be used is shown in FIG. 5. The filter structure includes a feedforward COMB filter, the non-linear functions and logical or functions. Filter operation further more includes following features: $x_i[n]$, $y_i[n]$ are time signals in one example corresponding with pixel grey values. The filter operation thus can be applied on the whole data, e.g. image, in parallel, i.e. to all of the individual input data in parallel. The signals $x_i[n]$, $y_i[n]$ in one example thus can be considered as images. The filter operates in tiling time windows having a length corresponding with a number of samples N, the tiled windows being generated by increasing the delay k from 1 to N. The number of samples N may be selected as function of the sampling rate, the required bandpass and required latency of the filter. During filter operation the delay k thus increases at each iteration, and the output signals $y_i[n]$ are equal to $OR\{f_i(x[n]-x[n-1]), f_i(x[n]-x[n-2]), f_i(x[n]-x[n-k])\}$, where $f_i(x)$ are threshold functions. At the end of the cycle, when k=N, following actions may be performed: $y_1[n] \ldots y_8[n]$ are combined by a series of logical functions (AND, OR, NOT), to isolate the searched features, $y_1 \ldots y_8$ are reset and k is set equal to 1. In other words, after each N iterations, the M output signals are combined in a series of logical operations to extract features.

In a second particular embodiment, the present invention relates to a data processor 100 for processing signal outputs as described above, e.g. as described in the first particular embodiment but not limited thereto, whereby at least the feature extracting means 106 is adapted with an arithmetic processor 110 comprising or consisting of a cellular non-linear network (CNN). The latter may be particularly suited for processing analog array signals. The cellular network may be hardware implemented, software implemented or a combination of hardware and software implemented. The cellular network may e.g. be hardware implemented on an integrated circuit chip. The latter may be a very large scale integration (VLSI) chip, the invention not being limited thereto. The CNN architecture may be a two-dimensional array of locally connected analog dynamic processors or cells. Such cellular network may be a non-learning network. In one example, the cellular network may be a cellular network architecture coupled to an optical input layer, such as e.g. a 128×128 cells cellular network architecture of the ACE16K CNN visual microprocessor as described above. In this case each pixel of an optical receiver may correspond with a cell of the cellular network architecture. By using a visual microprocessor with CNN processor, the CNN processor may accept and process images as data input in parallel and on a continuous time basis. Nevertheless, more generally the cellular network may receive its input from the input means 102, after the input signals have optionally been sampled by the sampling means 104. It is an advantage of embodiments according to the present invention, that the CNN architecture mimics to some extent the anatomy and physiology of many biological sensory and processing systems. The application of methods and systems according to the present invention allows that brain-like information processing algorithms, intrinsically analog and spatio-temporal, can be implemented. The latter results in at least some of the advantages as set out in the present description.

Figure 6A:
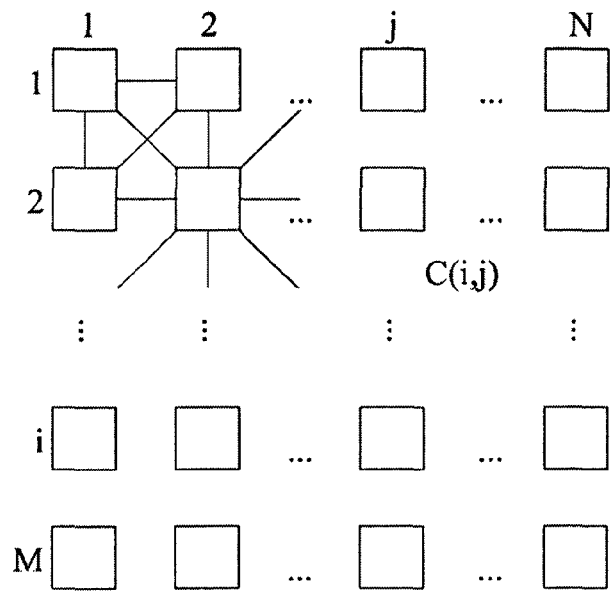
FIG. 6a to FIG. 6b is a schematic illustration of components and interaction in a cellular neural network or cellular non-linear network as can be used in embodiments of the present invention.
Figure 6B:
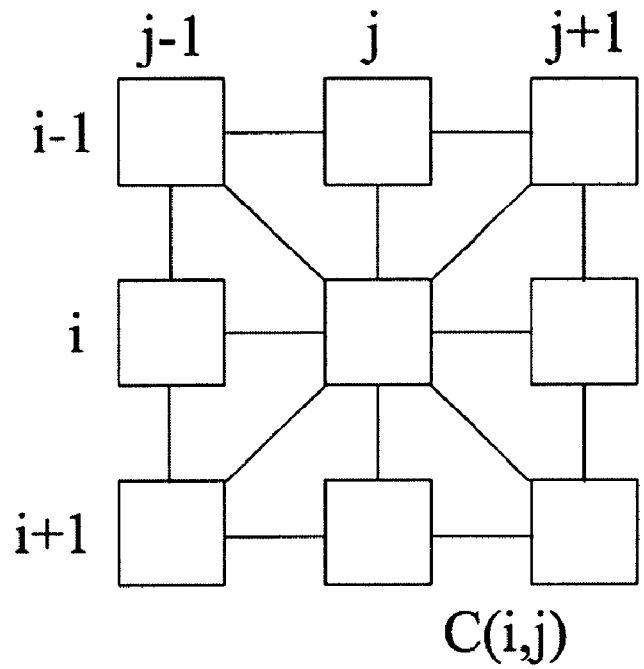
Figure 7:
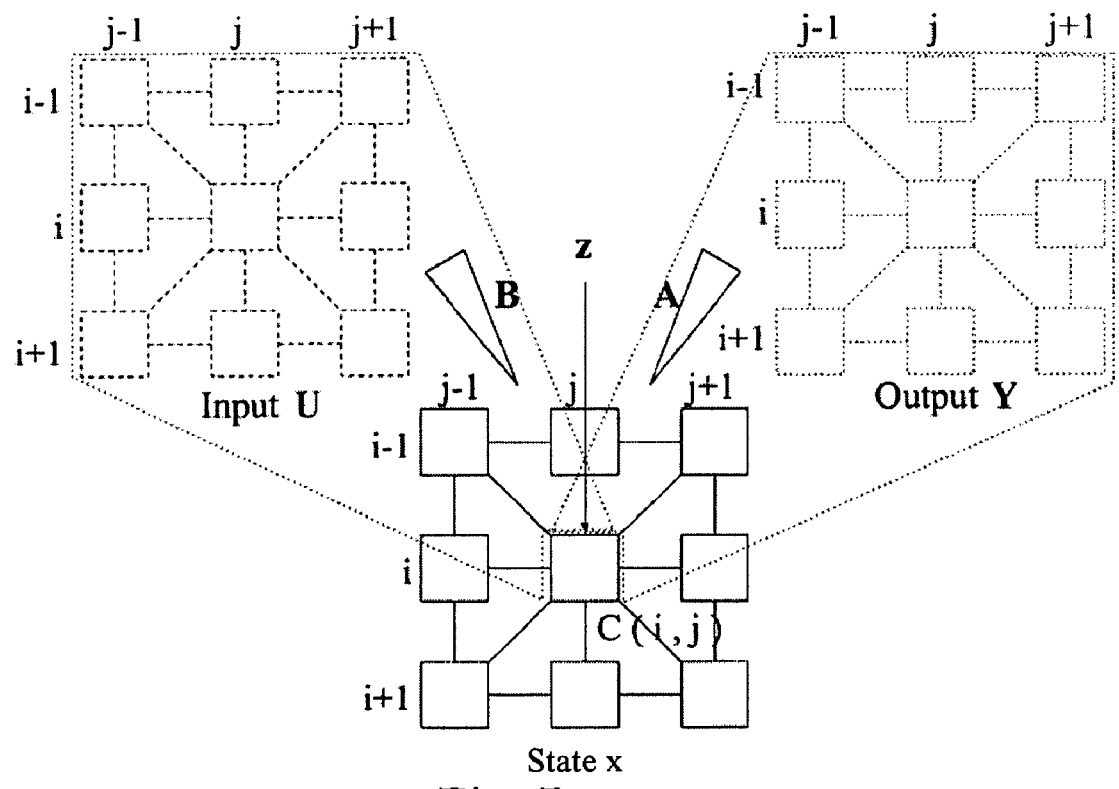
FIG. 7 is a schematic illustration of a the dataflow in a cellular neural network or cellular non-linear network as can be used in embodiments of the present invention.

The CNN may be a group of locally connected analog dynamic processors, or cells. By way of illustration, the present invention not being limited thereto, a CNN being a two-dimensional array of locally connected analog dynamic processors is shown in FIG. 6a and discussed in general. With reference to this figure, the cell in row i and column j will be indicated by the notation C(i,j). FIG. 6b illustrates the different synaptic connections linking cell C(i,j) with the surrounding cells. The subset of cells directly connected with C(i,j) is indicated by the notation S(i,j) or more particulary $S_r(i,j)$, whereby r indicates the radius of influence for the cell C(i,j). By way of illustration, in FIG. 6b the situation for r being the interdistance between 2 neighbouring cells is shown. Each cell C(i,j) may be characterised by a state $x_{ij}$ and produces an output $y_{ij}$. The state $x_{ij}$ depends on its previous state, a combination of the inputs u to S(i,j), a combination of the outputs y of the previous computation on S(i,j), and an offset value $z_{ij}$; $y_{ij}$ is a non-linear function of $x_{ij}$, usually a saturation function. In a more formal notation, the equation determining the future state of a cell is $$\dot{x}_{ij} = -x_{ij} + \sum_{C(k,l) \in S_r(i,j)} A(i,j;k,l) y_{kl} + \sum_{C(k,l) \in S_r(i,j)} B(i,j;k,l) u_{kl} + z_{ij}$$

while the output is related to the state by the non linear equation:

$$y_{ij} = f(x_{ij})$$

where A and B are two matrices, which may be referred to as feedback and input synaptic operators respectively, and $z_{ij}$ is the threshold of C(i, j). The data input and data output for the CNN cells is shown in FIG. 7. The triplet [A,B, z], which may be referred to as cloning template or simply template, completely characterizes each CNN. One example of a CNN hardware implementation may be the use of two 3×3 real matrices B, A (describing the weights of the connections between C(i, j) and its surrounding $S_r(i, j)$) and a real scalar z. It is an advantage of this embodiment that the CNN algorithm may comprise or consist of an ordered sequence of templates, that are applied in parallel at the same time to every input signal, topologically organized as a two dimensional image. It is an advantage of CNNs that they provide a suitable architecture to efficiently process large amounts of sensorial information. The CNN-based processor may use combinations of hand-shape features as well as spatial and temporal features extracted from arrays of sensors to control in real-time the computerised system.

Figure 8:
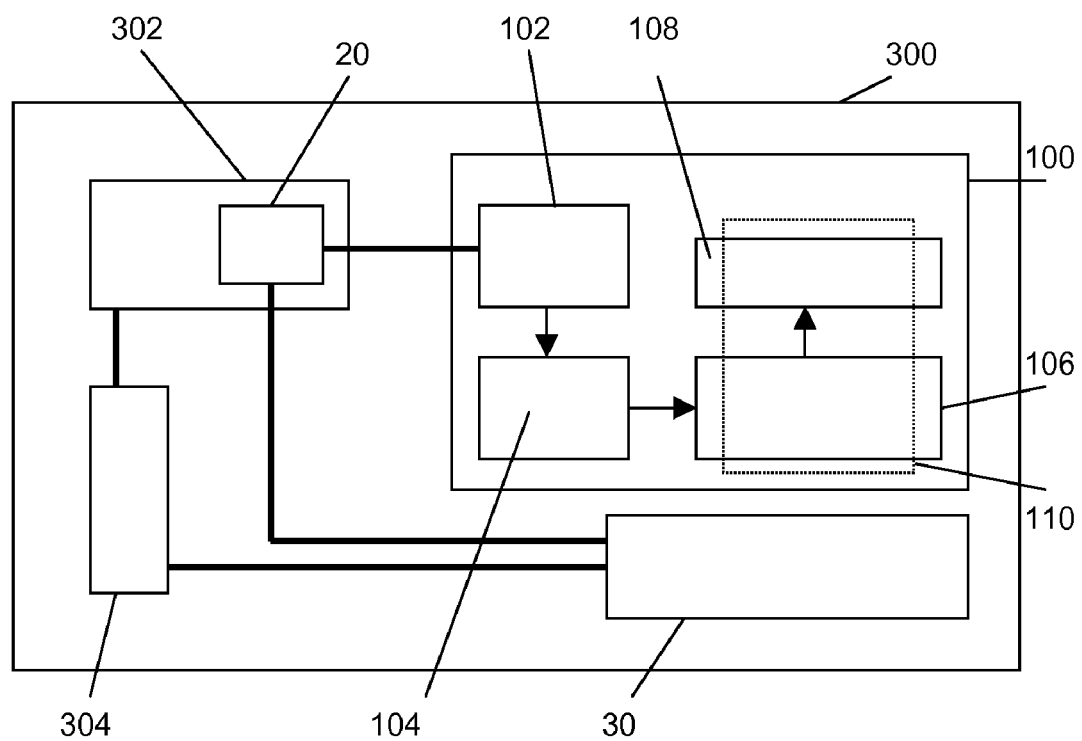
FIG. 8 is a schematic illustration of a computerised system according to embodiments of the second aspect of the present invention.

In a second aspect, the present invention relates to a computerised system, such as e.g. a robot like a humanoid robot or a computerised prosthesis. The computerised system comprises at least one moveable element having a plurality of topologically distinct sensors provided thereon. The sensors may be sensors for example mechanical sensors, e.g. pressure, force or acoustic sensors; electromagnetic sensors such as e.g. optical sensors, magnetic sensors, etc. The data processor may be particularly suitable for sensors providing a sensor output as response to mechanical stimuli. The system therefore is a multi-sensor system. Mechanical stimuli thereby may be movement of an object, a change in pressure by an object, etc. Such mechanical stimuli may, in agreement with the sensors indicated above, be sensed in an optical way, in a way using pressure or force, in an acoustic way, using electromagnetic interaction, using magnetic interaction, etc. In some embodiments, the object does not need to be or come in direct physical contact with the sensor in order to sense the mechanical stimuli. In other advantageous embodiments, the object is or comes in direct physical contact with the sensor or sensing surface. A moveable element may be adapted for performing manipulation of objects or for interacting with living beings. It may be actuated with an actuator. In particular embodiments according to the present invention, the computerised system may be a robotic hand or arm with hand for manipulating objects and/or interaction with living beings. Manipulation and/or interaction may be based on tactile events. The sensors therefore may be used for registering of tactile events, the invention not being limited thereto. More particularly, the system also may be used for interactions with objects wherein no direct physical contact is present. The computerised system may be adapted for everyday life tasks, such as e.g. grasp and lift tasks, tasks relating to displacement of objects, tasks relating to orientation of objects, etc. the invention not being limited thereto. The computerised system comprises a data processor as described in the first aspect of the present invention, comprising the same features and advantages as set out in the first aspect. The data processor receives its data from the sensors, e.g. after it has been pre-processed and/or converted. The computerised system furthermore may comprise a controller for controlling the moveable element as function of the signal output of the data processor. The controller therefore is adapted for receiving output data from the data processor and processing this data to control data for controlling the computerised system, e.g. the moveable element of the computerised system. The controller may provide processing functionality that may be implemented in the same hardware environment, e.g. host computer like a personal computer, as the data processing, although the latter also may be implemented to a separate computing device in communication with the data processor. The processing capacity of the controller may be provided by any suitable type of processor in the host computer such as for example a digital data processor or a programmable digital logic device such as a Programmable Array Logic (PAL), a Programmable Logic Array, a Programmable Gate Array, etc. By way of illustration, the present invention not being limited thereto, an example of a computerised system 300 is shown in FIG. 8, illustrating standard and optional components of such a system. The computerised system 300 comprises at least one moveable element 302, in the present example actuated by an actuator 304 which is controlled by a controller 30. The moveable element 302 comprises a plurality of sensors 20, which may e.g. be implemented as skin mechanoreceptors also referred to as sensitive skin receptors, the invention not being limited thereto. The moveable element 302 furthermore may be equipped with a set of encoders providing proprioceptive information, such as e.g. position information of the moveable element, which may be used in the controller 30 for determining further control signals for controlling the moveable element 302 in combination with the output of the data processor 100, that is adapted for receiving, processing and outputting processed data from the sensors. Further features and advantages of the computerised systems are described and/or illustrated by the features of the data processor 100 described in the first aspect as well as in the examples provided in the present invention.

Figure 9:
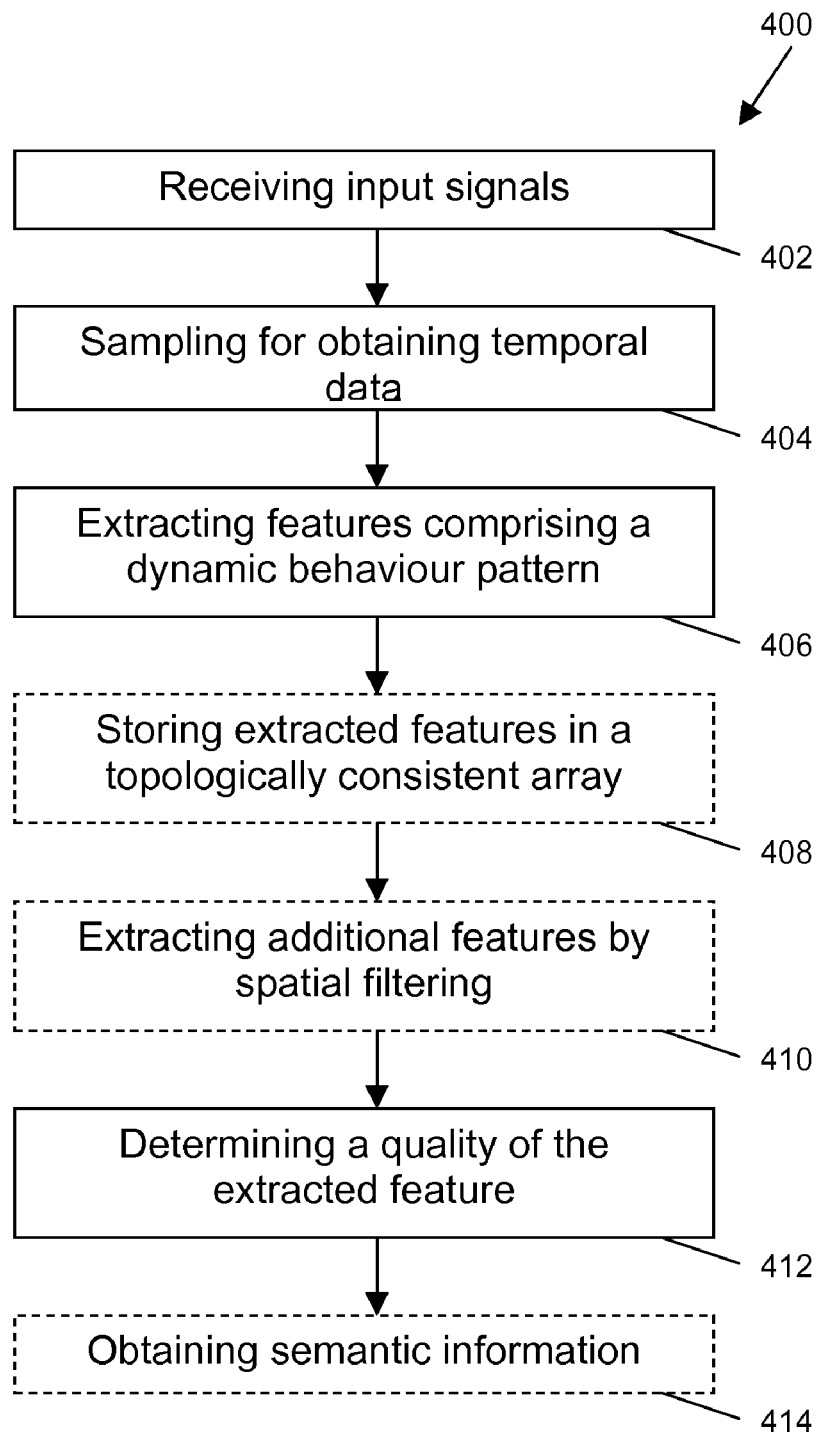
FIG. 9 is a schematic representation of an exemplary method for processing sensor output signals according to embodiments of the present invention.

In a third aspect, the present invention relates to a method for processing signal outputs of a plurality of topologically distinct sensors, such as for example mechanical sensors, e.g. pressure, force or acoustic sensors; electromagnetic sensors such as e.g. optical sensors, magnetic sensors, etc. The data processor may be particularly suitable for sensors providing a sensor output as response to mechanical stimuli. Mechanical stimuli thereby may be movement of an object, a change in pressure by an object, etc. Such mechanical stimuli may, in agreement with the sensors indicated above, be sensed in an optical way, in a way using pressure or force, in an acoustic way, using electromagnetic interaction, using magnetic interaction, etc. In some embodiments, the object does not need to be or come in direct physical contact with the sensor in order to sense the mechanical stimuli. In other advantageous embodiments, the object is or comes in direct physical contact with the sensor or sensing surface. Such method can advantageously be used for controlling a computerised system, e.g. during or for manipulation of objects or interaction with living beings. The method comprises obtaining a plurality of the sensor outputs in parallel and sampling the plurality of sensor outputs in time to generate temporal samples. The method furthermore comprises extracting features with a dynamic behaviour pattern by arithmetic processing in parallel of neighbouring temporal samples of the sensor outputs, e.g. in a topology consistent way. The latter may be performed taking into account or based on a topological arrangement of the sensor outputs. The method also may comprise extracting features with a static behaviour pattern by arithmetic processing in parallel of neighbouring temporal samples of the sensor outputs. The method furthermore comprises determining a quality of the extracted features. By way of illustration, an exemplary method 400 for processing signal outputs of a plurality of distinct sensors is shown in FIG. 9, indicating standard and optional steps. In a first step 402, the output signals of the plurality of sensors is received as input. The signals thereby are obtained in parallel, thus assisting in efficient processing. Receiving the input signals may be by optically detecting the input signals, although other type of signals, such as e.g. electrical signals, also could be processed. The input signals may be analog input signals. In a second, optional step 404, the input signals optionally may be sampled so as to obtain temporal data. Another example is that the input data received may be directly received as temporal data. The latter may be performed in any suitable way, such as e.g. using a shutter in an optical receiving input unit. In a third step 406, features having a dynamic behaviour pattern are extracted using arithmetic processing. The latter may be performed taking into account topology of the sensor outputs. The arithmetic processing is performed in parallel on neighbouring temporal samples of the sensor outputs, also referred to as signal input for the data processing system.

Such arithmetic processing may comprise or consist of applying a bandpass high-pass or low-pass filter or a combination of bandpass, high-pass or low-pass filters operating on the data only in the temporal domain. It thus may comprise a filter sensitive to one or more bands that are not consecutive. The arithmetic processing may comprise or consist of applying a filter wherein only thresholding, delaying, subtracting, logical and/or morphological functions are used. The filtering may be non-linear. The arithmetic processing may be performed with or using a cellular non-linear network.

The processing may be performed on data organised as images. The features may be as described in the first aspect. In an optional fourth step 408, the extracted features may be stored in a topologically consistent format, e.g. in a topologically consistent array. In other words, the position of the sensor with respect to its neighbours in the computerised system may correspond with the stored position of the processed data of the sensor with respect to the stored processed data of the neighbouring sensors. In an optional fifth step 410, additional features may be extracted by spatial filtering or a combination of spatial and temporal filtering. The latter may be performed with any suitable filter and may be used for extracting spatial features such as area and distribution of sensor signals of activated sensors. In a sixth step 412, a quality of the extracted features is determined. The latter may be performed prior or after the optional spatial filtering. Quality may be as described in the first aspect. Determining of a quality may e.g. be determining of a stability of an extracted feature or a corresponding event. In an optional step 414, the determined quality data may be converted to semantic information, expressing the actual action performed during the manipulation in the real world, and allowing a controller to further control the computerised system accordingly. Either this semantic information or the quality information may be provided as output information to the controller. Other features and aspects of the method for processing may be features expressed by the functionality of the features of the data processor as described in the first aspect. In one embodiment, a further optional step may be performed, advantageously at the start of the procedure. This further optional step comprises tuning parameters in the proposed algorithm to the current hardware configuration, e.g. determined by the materials used, the sensors used, a thickness of the covering layer of the sensors, etc. The latter may e.g. be especially useful for manipulation wherein slipping may play a significant role.

In a fourth aspect, the present invention relates to a method of controlling a computerised system. The computerised system thereby comprises at least one moveable element comprising a plurality of topologically distinct sensors, such as for example mechanical sensors, e.g. pressure, force or acoustic sensors; electromagnetic sensors such as e.g. optical sensors, magnetic sensors, etc. The method comprises measuring a plurality of output signals from the sensors and processing signal outputs using a method as described in the third aspect so as to obtain a quality of extracted features. The method furthermore may comprise determining a status of the computerised system and/or controlling the at least one moveable element based on the quality of extracted features. Such controlling may for example be controlling a position or movement of the at least one moveable element. Such a method may assist in improving of perception of events occurring and features being present in the environment by the computerised system. The features and advantages of the method steps for processing the signal outputs are the same as described in the third aspect and therefore not repeated here.

In one embodiment, the method may comprise, prior to obtaining input data in the data processor, opto-electronically converting the electric or electronic signals of the sensors into optical signals so as to obtain the output signals of the sensors in an optically coded manner. The signals may be provided in parallel e.g. as image.

In one embodiment, the method for controlling a computerised system may include an initial test step for checking whether the sensors are properly operating. The latter may for example be performed by determining over a period of time the output signals of the sensors when not triggered or actuated and deriving there from sensors that are not-trustable, e.g. broken, so as to exclude these from use. The latter is especially useful when the plurality of sensors is redundant.

Controlling of the at least one moveable element may comprise first converting the information regarding quality of extracted features to a semantic data, representative of the manipulation situation in the real world, and thereafter using the semantic data. Furthermore, controlling of the at least one moveable element may comprise taking into account proprioceptive information, e.g. obtained from encoders on the computerised system. Other optional features of the method comprise process steps as induced by components of the computerised system described in the above aspects and the additional examples.

Figure 10:
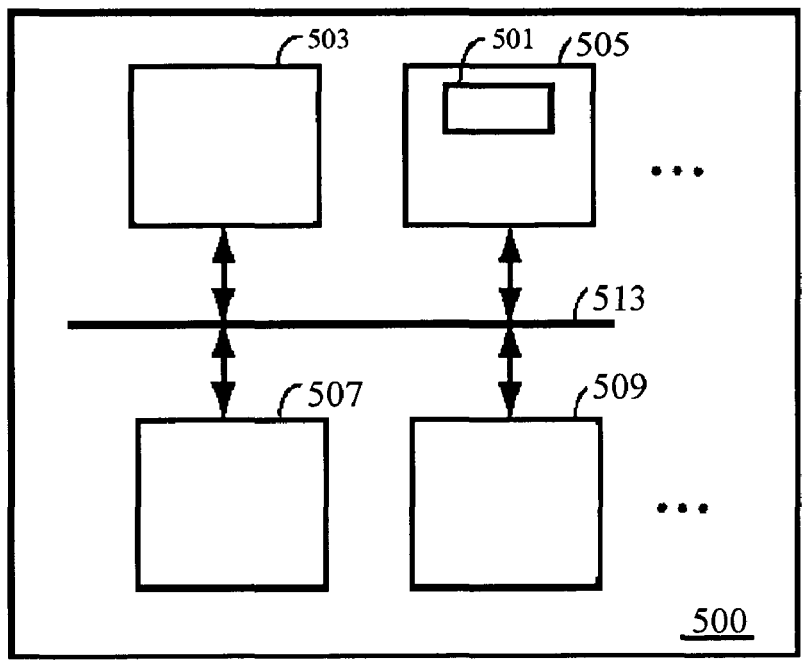
FIG. 10 illustrates a computer system that can be used as host computer for performing a method according to embodiments of the third aspect of the present invention.

The above-described method embodiments of the third or fourth aspect of the present invention may be implemented in a processing system or processor as described in the first aspect. FIG. 10 shows one configuration of processing system 500 that includes at least one programmable processor 503 coupled to a memory subsystem 505 that includes at least one form of memory, e.g., RAM, ROM, and so forth. It is to be noted that the processor 503 or processors may be a general purpose, or a special purpose processor, and may be for inclusion in a device, e.g., a chip that has other components that perform other functions, as long as they allow to provide the functionality expressed in the method steps of the claimed and/or described method. Thus, one or more aspects of the present invention can be implemented in electronic circuitry, or in computer hardware, firmware, software, or in combinations of them. The processing system may include a storage subsystem 507 that has at least one disk drive and/or CD-ROM drive and/or DVD drive. The storage subsystem 507 may comprise a solid state memory for storing a computer program product for performing the steps of the method embodiments as described above. In some implementations, a display system, a keyboard, and a pointing device may be included as part of a user interface subsystem 509 to provide for a user to manually input information. Ports for inputting and outputting data also may be included. More elements such as network connections, interfaces to various devices, and so forth, may be included, but are not illustrated in FIG. 10. The various elements of the processing system 500 may be coupled in various ways, including via a bus subsystem 513 shown in FIG. 10 for simplicity as a single bus, but will be understood to those in the art to include a system of at least one bus. The memory of the memory subsystem 505 may at some time hold part or all (in either case shown as 511) of a set of instructions that when executed on the processing system 500 implement the steps of the method embodiments described herein. Thus, while a processing system 500 such as shown in FIG. 10 is prior art, a system that includes the instructions to implement aspects of the methods for processing signals or data is not prior art, and therefore FIG. 10 is not labelled as prior art.

The present invention also includes a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

By way of illustration, the present invention not being limited thereto, the example of a computerized system being an anthropomorphic arm equipped with an under-actuated biomechatronic hand will be described in more detail, as well as examples of methods for processing signals for control of such an anthropomorphic arm equipped with a biomechatronic hand and methods for controlling such a system. It is to be noticed that, although system features and/or method features are described for the anthropomorphic arm equipped with biomechatronic hand, these can be incorporated, applied and/or used in different computerised systems, methods for data processing in different computerised systems, or control methods of different computerised systems, within the scope of the present invention. The examples illustrate particular features and some of the advantages obtainable by embodiments according to the present invention Example 1

Computerised System

Figure 11:
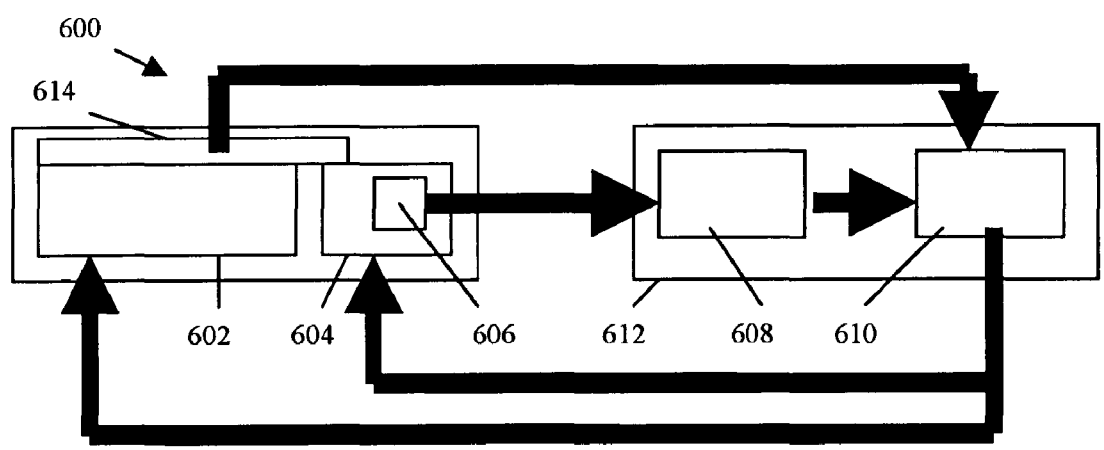
FIG. 11 illustrates a computerised system based on a biomechanical hand, being an example of a computerised system according to an embodiment of the second aspect of the present invention.

A computerised system 600 as discussed in the present example is shown schematically in FIG. 11, wherein both the anthropomorphic arm 602 and the biomechatronic hand 604 are indicated. The biomechatronic hand 604 with two fingers mounted and sensorised was installed, whereby each finger was controlled by only one pulling cable, in such a way that the hand adaptively can wrap the grasped objects. A task controller 610 is used for controlling the arm 602 and/or hand 604 resulting in a smooth and vibrations-free movement. In the present example, the inner surface of each fingertip was covered with three tactile modules, consisting of a flexible array of micro-fabricated force sensors 606 and electro-optical converters. In this particular case, each module array consists of a number of microfabricated triaxial force sensors 606 assembled on a flexible substrate and covered with a soft polyurethane layer with protection and grip purposes. Three electrical signals are extracted from each sensor and processed and converted into light pulses by the opto-electronics embedded in each module. Light-coded tactile information form a tactile image is transferred to the data processor 608, in the present example being a cellular neural network CNN visual microprocessor, hosted together with the task controller 610 in a general processor 612, in the present example being an industrial PC, a Bi-I v2 PC from AnaLogic Computers Ltd., Budapest, Hungary. The task controller 610 used was a Texas Instruments TMS320C6415 digital data processor (DSP) running at 600 MHz, and the data processor 608 was an ultra fast ACE16K CNN visual microprocessor (from AnaFocus Ltd6), being a digitally-controlled analog array processor used as input device and main processing unit (arithmetic processor). This processor consists of a 128×128 CCD optical input layer on top of a 128×128 cells CNN architecture. Appropriate time information is obtained by appropriately setting an integration time (shutter) on the visual microprocessor, i.e. sampling, such that the acquired tactile data are obtained as dynamic grey-scale images (brighter areas indicate stronger stimuli). The positions of sensors 606 and pixels in the image are topologically consistent, i.e. the location of a given sensor 606 on the fingertip surface corresponds to the relative position of the corresponding pixels in the tactile image. In the present example, a single tactile channel projects its information over a small group of more or less 16 adjacent pixels. A portion of the input image corresponds to thumb sensors, while another to index sensors. Every feature is always computed over the whole input image, with no computational overload. In the present example, mask images are used to extract the positions where a given feature was detected, by means of CNN morphological and logical operations. The data processor 608 thus uses a CNN based processor, providing a given CNN-based feature extraction algorithm that returns a binary image in which white portions indicate areas of the image (and of the corresponding input space), where that feature has been detected. As three light signals, only poorly correlated with the stimulus direction, are extracted from each sensor 606, so that the exteroceptive system used in this work consists of 54 tactile optical signals. A rigorous calibration of the sensors 606 arrays would produce signals codifying precisely the input stimulus intensity along each direction, but the approach followed here made this step unnecessary: the data processor 608 is fed with signals only poorly correlated with the stimulus direction; alternatively said, the implemented tactile system accepts as input raw and direction-uncorrelated signals. In the present example, a cable made of plastic optical fibres (POFs) convey optically coded information from the tactile sensors on the hand fingers to the general processor 612, projecting the tactile image on the optical input layer of the ACE16K visual microprocessor and processing the images immediately in the CNN architecture that is hosted below the optical layer (each pixel is the optical input of the corresponding CNN cell). The system may comprise a coupling element for focussing the light onto the chip. The result of the tactile image processing inside the CNN chip, which represents a quality of features detected or the correlating semantic representation thereof, is transferred to the task controller 610 and used together with proprioceptive information received from encoders on the arm and hand 614, for providing e.g. positional information. The general processor 612 communicates with the arm 602 and the hand 604 or their local controller, e.g. over a network. FIG. 11 shows the different flows of information in the architecture of the robotic system used in the present example.

Example 2

Detection of Features

For the present example of grasping, algorithms based on the recognition of three kinds of tactile events, recognized in the temporal domain are used, being variation, oscillation and vibration. These three types of features are, in the present description, described as follows:

variation: a given tactile signal contains a variation if its intensity changes by at least a given threshold a in the same period T. The threshold σ thereby is, in the present example, defined in terms of pixel intensity, expressed in number of grey levels (out of 255) and depends on the noise level of the tactile signals; a variation can be positive, if the intensity increases, or negative. A preliminary characterization of the tactile module and the noise performances of the sensors in the present example allowed to consider σ=5 grey levels (2% of the entire dynamic range).

oscillation: an oscillation is the composition of two subsequent variations of opposite sign in the same period T, with amplitudes of a least n.σ and m.σ respectively, thus showing a certain tendency to periodicity. In the present example, n=3, m=1 proved to be a good choice to detect oscillations in normal manipulation.

vibration: a vibration is the sequence of at least two oscillations in two subsequent periods T.

Figure 12A:
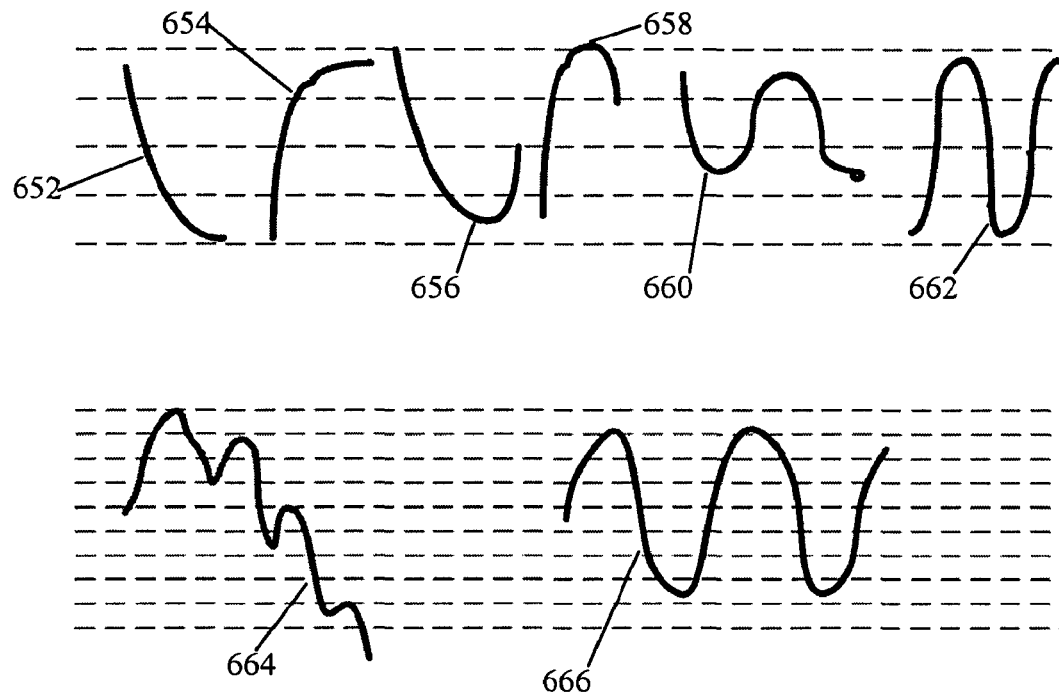
FIG. 12a and FIG. 12b illustrate definitions of features and parameters used in the extraction of features, as used in the description of an exemplary method for manipulating an object according to embodiments of an aspect of the present invention.
Figure 12B:
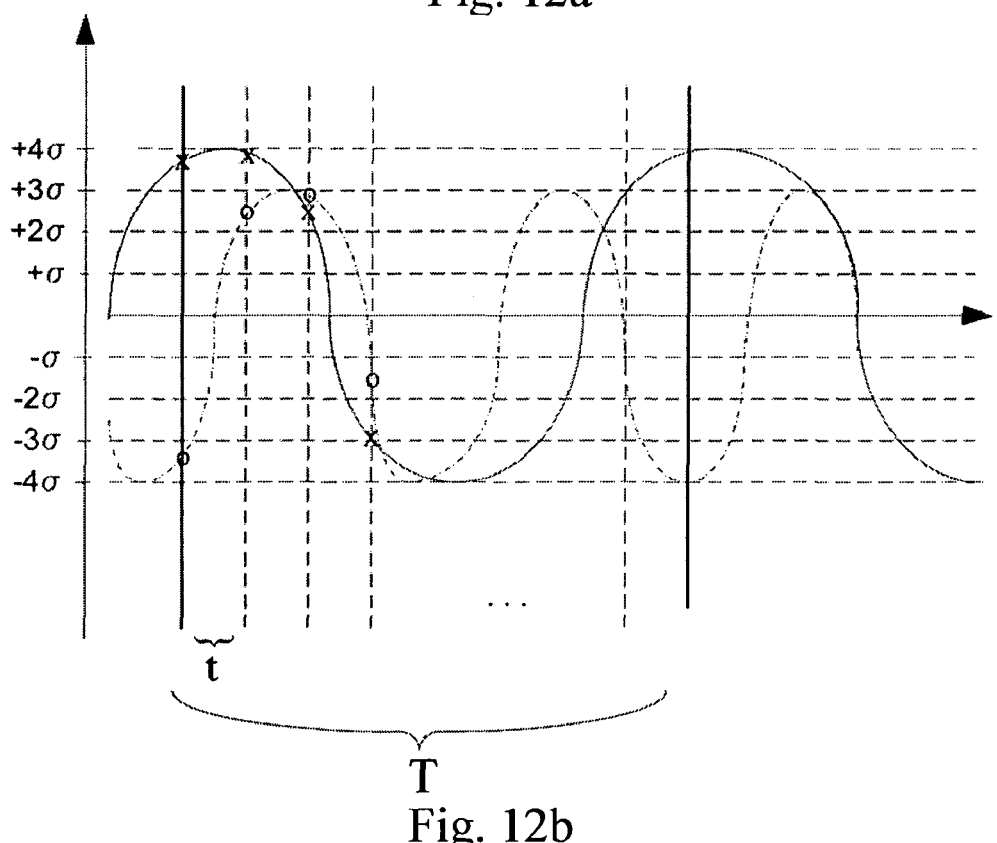

FIG. 12a schematically represents tactile signals as they are classified in this work: the first and second signals 652, 654 are variations but not oscillations, as the tendency to periodicity is missing. In the third and fourth signals 656, 658 the two conditions for an oscillation to be detected are matched. The last curve 662 is a sequence of at least two oscillations, and is recognized as vibrations while the fifth curve 660 does not match the condition on minimum amplitude of variations and is not recognized as vibration. It is worth noting that, within the proposed naming convention, all signals 662, 664, 666 shown in FIG. 12a are considered as vibrations, even though signal 664 is clearly non periodic. With these naming conventions, the detection of tactile signals vibrations (often associated with slippage) can be reformulated as the detection of oscillations which occur inside two consecutive periods. As both amplitude and frequency of oscillations appearing during slip may vary, depending on the properties of the skin, on the weight, material and softness of the object and, of course, on the sensibility and capability of the sensors of detecting suddenly changing stimuli, the oscillations with amplitude and frequency values were detected within a quite large range. In the present example, detection of tactile signals with frequency content within the range 20-50 Hz was found appropriate. The period used in the present example was T=25 ms. With a sampling period t of 2.5 ms, a sampling rate of 400 Hz was obtained. These are indicated in FIG. 12b.

In the present example, the algorithm, running in parallel in the data processor for all sampled sensor outputs, searches for signal oscillations within consecutive periods of T seconds. In order to cope with memory size concerns and minimisation of comparisons and updates, the time as divided into contiguous period windows, each of them of duration T. In the present example, the drawbacks of selecting contiguous period windows instead of e.g. a sliding window, did not have significant effects on the whole tactile information processing chain. Nevertheless, using larger computing power, also a sliding window could be selected.

In the present example, feature extraction is realised by parallel processing of all the tactile sensorial information while assuring a high frame rate for image capturing, resulting in a computational efficient system. The algorithms used were designed so as to minimize the number of data transfers to the task controller and were based on using only stable and reliable CNN operators.

Figure 13:
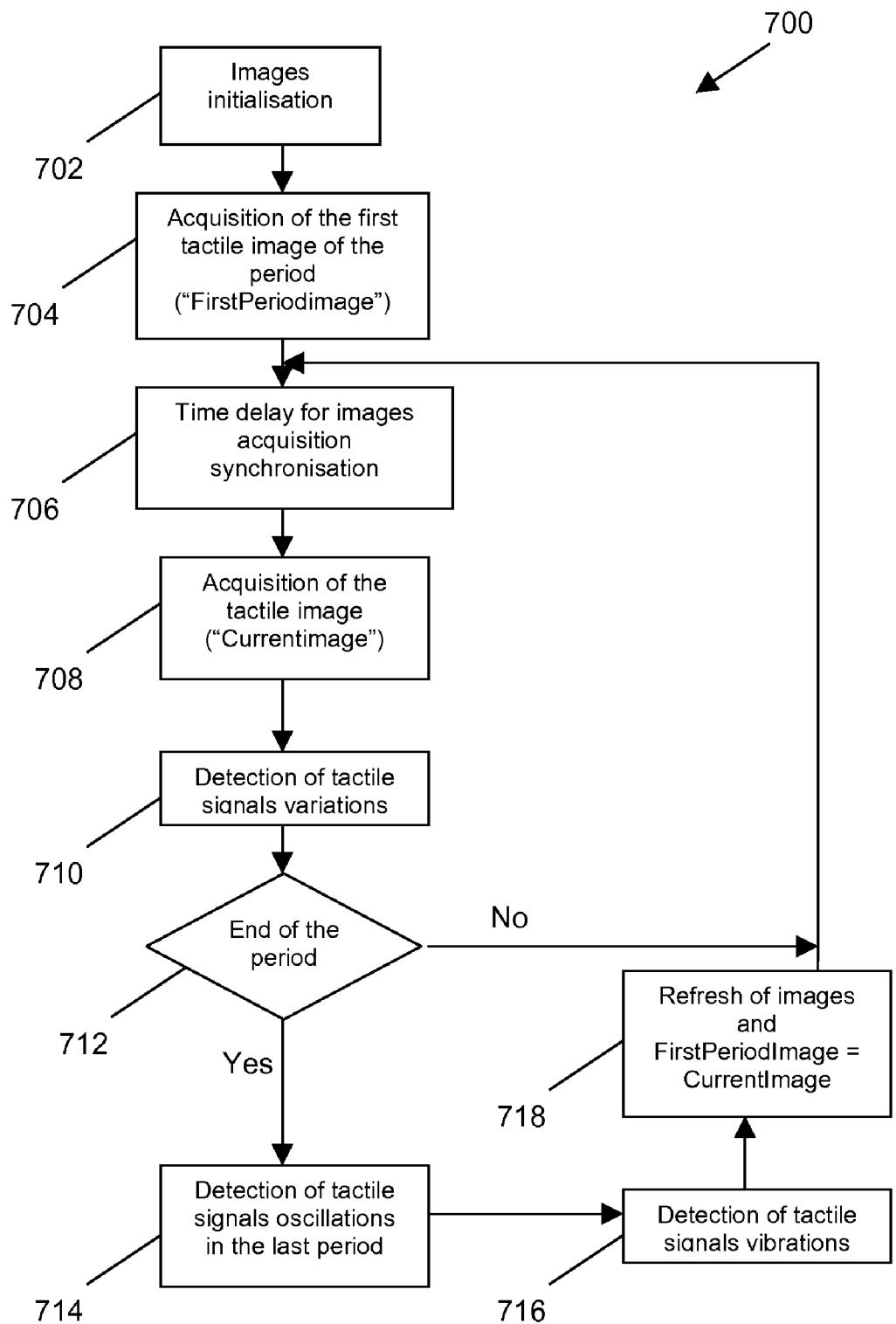
FIG. 13 shows a block diagram for an algorithm for detecting tactile events being an illustration of a method for manipulating an object according to embodiments of an aspect of the present invention
Figure 14:
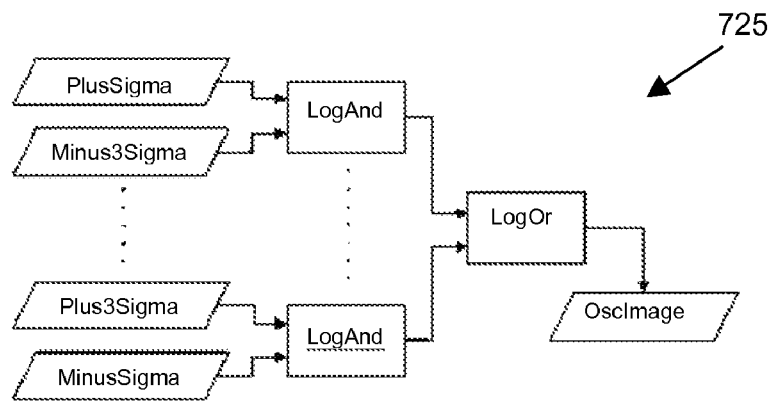
FIG. 14 shows an exemplary algorithm for detecting tactile signal oscillations as can be used in a method for manipulating an object according to embodiments of an aspect of the present invention.

By way of illustration, FIG. 13 illustrates an exemplary block diagram of the general CNN algorithm 700 used for detecting tactile events in the present example. In the initialisation phase 702 the image buffers are set to a proper initial black value (by means of the filblack operator). Then the first image, labelled e.g. "firstperiodimage", is acquired 704 and denoised on the ACE16k processor and it is stored as the first tactile image of the examined period. A time delay is set 706, to synchronize the acquisition rate and then a following image, labelled e.g. "currentimage", is acquired 708. In step 710, the detection of tactile signals is performed, in the present example being detection of variations. The detection of these tactile signals is basically based on CNN operators to realize, at each iteration, a comparison between the images 'CurrentImage' and 'FirstPeriodImage'. An algorithm for such detection may have a symmetrical structure, thus allowing detection of positive and negative variations. The comparison may involve the subtract and the threshold CNN operators, and aims at evaluating how much the tactile signals are varying with respect to the tactile conditions at the beginning of the current period. More precisely, by thresholding the subtractions images several binary images are obtained, whereby each of those indicate all the regions that have changed for more than a given threshold n.σ. The accuracy of such detection is limited by the value of the least reliably measurable variation σ. This procedure results in the update of a set of binary images which store the presence of variations of the tactile signals. In the general CNN algorithm 700, the previous steps are repeated, with a new 'CurrentImage' at each iteration, till the end of the period is determined in a decision step 712 as indicated in FIG. 13. At the end of each period, a cross-check on the binary images is performed in order to isolate the tactile areas where oscillations occurred during the last period, as indicated in step 714. A more detailed overview of an exemplary algorithm 725 for this detection is shown in FIG. 14. Couples of the binary images are compared by means of the logAND CNN operator, being a logical operator. Each AND is employed to detect oscillations with a particular wave shape along the examined period. Further, the images are coupled, at the input of the AND operators, in such a way to ensure that the oscillations spread over a sufficiently wide luminance amplitude. The logOR operator is used to collect the tactile signals that have oscillated along the examined period in only one image named 'OscImage'. Finally, vibrations are detected, as indicated in step 716, in the areas where oscillations occurred in the last two periods. To detect vibrations, for example the images 'OscImage' obtained in the previous step and associated to two consecutive periods are ANDed (logAND operator). After that, the general CNN algorithm 700 performs a refresh of some images, as indicated in step 718, so as to set up the variables state to perform the analysis of the next time period. In particular the last tactile image of the last period becomes the first and reference image of the next period (FirstPeriodImage=CurrentImage).

Figure 15:
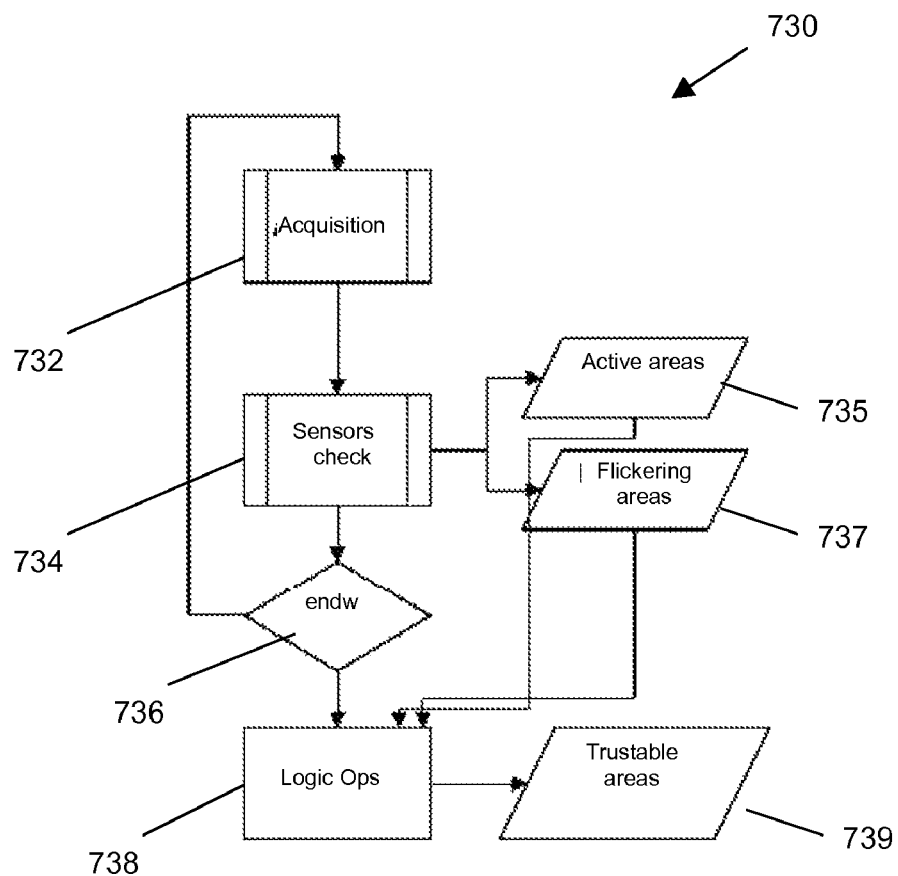
FIG. 15 shows an exemplary algorithm for checking the state of the sensors of a tactile system as can be used in a method for manipulating an object according to embodiments of an aspect of the present invention.

In order to prevent errors caused by defects in the system, the process may be initiated with a warming phase, wherein the appropriate operation of the sensors is checked. An example of an algorithm 730 that may be used for this is shown in FIG. 15. When the hand is open, a sequence of images is acquired, as indicated in a first step 732, and fed into a procedure that performs a sensors check, indicated in step 734. The sensor check procedure evaluates all image areas and indicates those images that are activated 735 or flickering 737, and thus not black over the entire period, as broken sensors. The latter can be decided as for the open hand, no tactile signal should be sensed by the sensors. When it is decided that a sufficient check is performed, indicated by decision step 736, an image of trustable areas 739 is generated, the generation step 738 taking into account the non-trustable areas indicated during the sensor check step by excluding them from the computation of trustable areas. This feature increases the robustness of the whole tactile system, especially when many sensors are present and redundancy can, as in this case, be exploited. As shown in FIG. 15, the output of this procedure is a binary image (a mask in CNN language) containing the trustable areas.

Example 3

Determination of the Quality of Features

Determination of the quality of the features and correlating it with semantic features in the present example is performed by checking the stability over time of the extracted features. The latter preferably takes into account not only time features, as used for extracting features from the data signal, but also spatial and intensity features. Such a mix may be especially suitable for grasping objects of extremely slippery nature and having a smooth surface, such as e.g. with tofu. When grasping less slippery objects, in some cases only temporal information features is sufficient. Therefore, the safety of the grasp may also be based on a size of the contact area and on the minimum applied force control.

Figure 16:
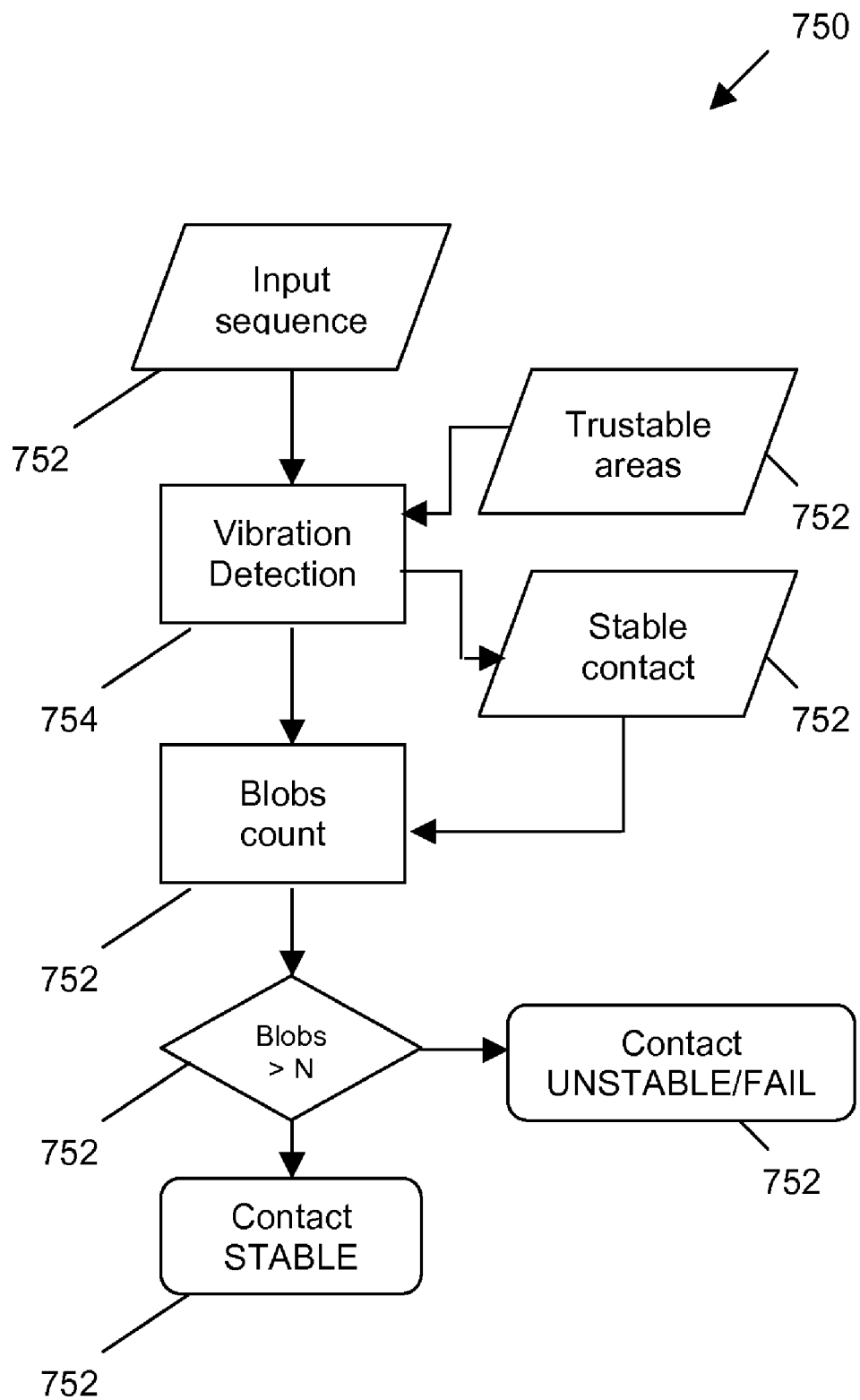
FIG. 16 shows an exemplary algorithm for determining a stability of a grasp or lift as can be used in a method for manipulating an object according to embodiments of an aspect of the present invention.

Determination of the quality of features, may e.g. be performed as soon as some initial contact has been detected. By way of illustration, the present invention not being limited thereto, an exemplary CNN algorithm, as can be used is shown in FIG. 16. Determination of the quality of features in the present example includes determining the stability over time of the extracted features. The exemplary algorithm 750 performs a check on the stability over time of the trustable areas of the incoming tactile images, by means of gray-scale and morphological operations corresponding with receiving an input sequence of images in step 752 and detecting vibration 754 based on trustable area information 753. In particular, analog differences between subsequent images and binary thresholding operations are used. In order to keep the computational requirements low, a single binary image is used to keep trace of the varying parts of the tactile input sequence. A binary image containing stable active areas is finally generated, shown by step 755. A threshold is then applied on these areas input image on the locations corresponding to active areas, to assure that the safe contact area is sufficiently large. As two different sensory channels project on two geometrically separated (non connected) areas of the tactile image, also called blobs, this phase can be described, for the sake of simplicity, as a count of the active blobs, illustrated by step 756. A decision step 758 then allows to determine whether the contact is safe, indicated by step 760 or not safe, indicated by step 762. In case the safe contact area is not large enough on one or both fingers, or the intensity of the tactile signal on stable areas is not sufficient, the procedure will trigger a small contracting pulse on the corresponding finger motors. The friction coefficient between the finger and the object is not estimated with this approach to contact quality assessment, ant the entire procedure, with a duration of 100 ms, is carried on before lifting the arm. The computation involves therefore 40 images acquired at 400 Hz.

Example 4

Task Control

Figure 17:
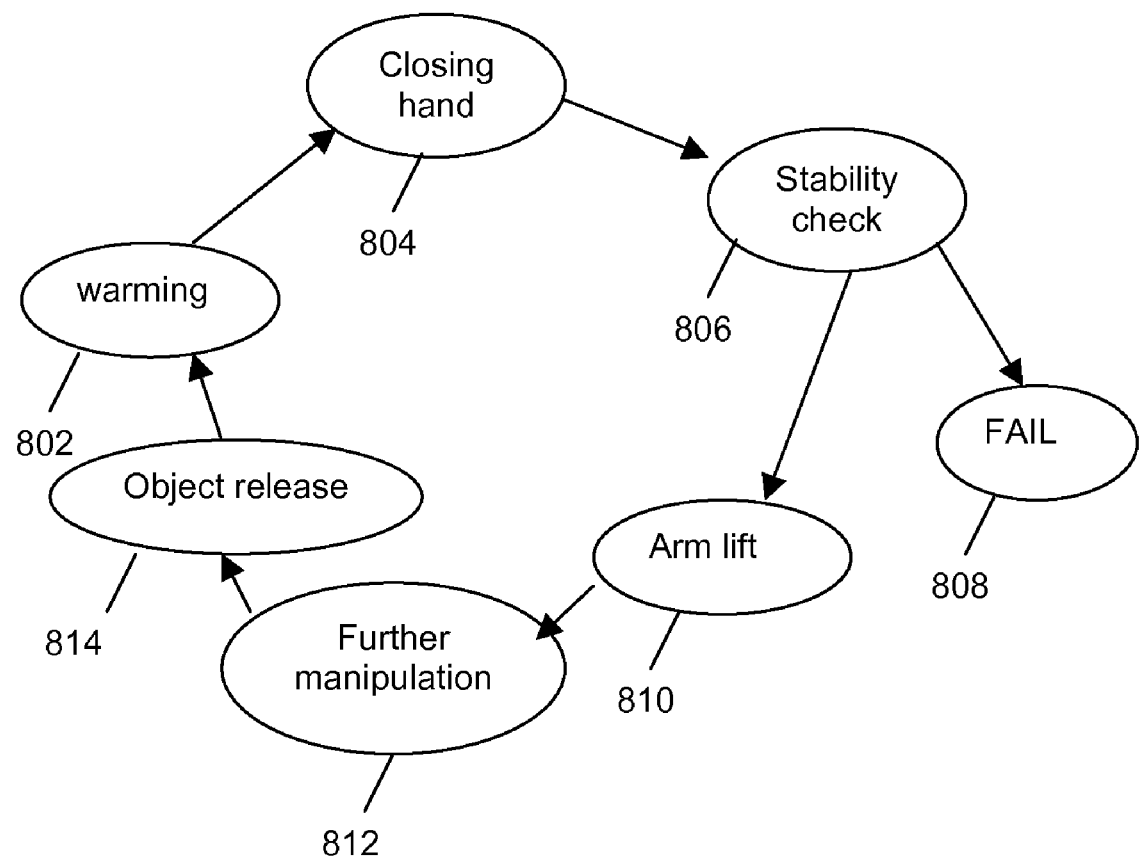
FIG. 17 shows a model of a method for grasping and lifting an object being an example of a method for manipulating an object according to embodiments of an aspect of the present invention.

Using for example the above specified algorithms, the invention not being limited thereto, the task of grasping and lifting is discussed further in the present example, with reference to the computerised system as described in example 1. The method 800 for performing the task consists of the following phases, described with reference to FIG. 17 where part of a finite state modelling of the task is shown.

In a first step, i.e. step 802, a warming phase is performed wherein a number of images are acquired with the hand open, and a check is performed to find broken sensors and exclude them from following processing. Such warming phase may be performed using an algorithm as described in FIG. 15, although the invention is not limited thereto. After an initial warming phase during which the system isolates the eventually broken sensors, the robotic hand is expected to close around the object (hand closing phase) until contact is detected. In a second step 804, the grasping therefore is initiated by closing the fingers of the hand independently actuated. These close until some contact with an object is detected. The detection of some contact is the only signal able of stopping the hand closure. The contact event triggers the migration to the Stability check state, which evaluates the quality of the contact. In a third step 806, the quality of the contact thus is evaluated to assure a suitable grasp before lifting the hand. A sufficient grasp quality is eventually reached by means of small and quick closing pulses on the fingers until certain criteria on the input tactile image are satisfied. In case of insufficient stability, the hand may perform a small but sudden additional closure and if no sufficient stability is obtained, the system may indicate a fail, as indicated by step 808 and e.g. open the hand. After a stable grasp has been reached, in a fourth step 810, the hand lifts the object, reacting to tactile events like vibrations, or oscillations such those arising during slip or external stimulation, through small and quick closing pulses. The lifting in the present example is performed by lifting the arm until a height of 10 cm is reached. In an optional fifth step 812, a further manipulation such as e.g. movement or stand still of the object is induced. In the present example, the object was held in place for ten seconds. The latter is to illustrate the stability of the method. During both this and the previous step, the controller causes the hand to close by small and quick movements in case slip is detected. In a sixth step 814, the object is released and the arm is returned to the initial position.

The above method is controlled by the task controller. Transitions between the different tasks may be regulated either by proprioceptive information such as positional information from arm or hand encoders or such as time intervals from a timer or by exteroceptive semantic information, obtained from the peripheral part, i.e. the sensors, from the computerised system.

By way of illustration, further examples are provided whereby movement or intention of movement are detected. It is to be noticed that these examples are not to be considered as limiting. The examples illustrates detection of a mechanical stimulus (movement) in an optical way. In the examples the movement of an object in a traffic situation is derived using optical detectors. The movement is derived in similar way as described above, i.e. extraction of features with dynamic behavior is performed taking into account topology of the sensor outputs. Such features may for example be local changes like oscillations or vibrations within a pattern or part thereof.

Example 5

Figure 18:
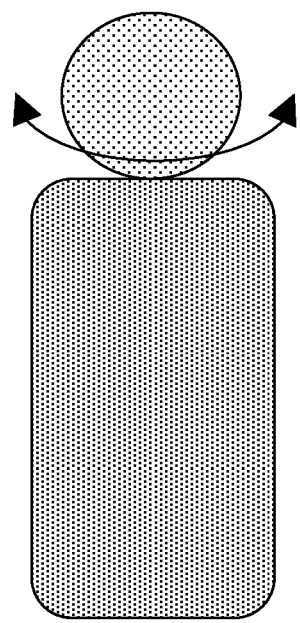
FIG. 18 shows an example of an event of a pedestrian crossing the street which can be detected using a system and/or a method according to embodiments of an aspect of the present invention.

In the fifth example, detection of the intention of a pedestrian crossing a road is illustrated. In a first step, the pedestrian may be detected by conventional detection means, as known by the person skilled in the art. Different algorithms for the detection and identification of a head and body of a pedestrian are known and can be implemented in a system according to the present invention, e.g. by operating on an image of the traffic scene detected with the system. For example, the body and head of a pedestrian may be represented as a cylinder and ellipse respectively. Recognition of pedestrians and the algorithms applied, may be performed in combination with the system according to the invention. In this way, a simplified model of a pedestrian may be projected as input. Processing of the image for extracting features with a dynamic behaviour then may be performed using a system as illustrated above for the grasping movement. The latter may be used for recognising a vibration of the head with respect to the body, representing the movement that a pedestrian makes by looking left and right before crossing the road. Such a vibration can in this case for example be detected by detecting a vibration of a head or a representation therefore on a non oscillating body or a representation thereof. The same algorithms can be applied as provided in the above described examples, wherein the event detected, being the crossing of a road by a pedestrian or the intention of crossing of a road by a pedestrian, is based on the recognition of features with a dynamic behaviour, being the oscillation of the head. The event thus can be recognised by detection of spatial and temporal features having a dynamic behaviour. It is an advantage of embodiments according to the present invention that, by the parallel processing, the technology makes it possible to detect multiple pedestrians present on the scene, without additional computational requirements, while keeping trace of where the stimuli arose. FIG. 18 illustrates a model for the pedestrian, whereby an oscillating motion of a head with respect to the body could be identified as an indication of an event wherein the pedestrian will cross a road. A system, e.g. vehicle, may be provided with a task controller for controlling a task to be performed, a set of sensors, a sensor output processing means and a quality determining system for determining a quality of a feature or event occurring may be provided. The sensor output processing means and the quality determining system may be as set out in examples 2 and 3. Detection of an oscillation may be detection of an oscillation in the signal representative for the outer portions of the head or the model thereof. The sensor arrays may be optical detectors for optically detecting a movement.

The task controller may be responsive to the obtained quality of the feature or event detected and may upon e.g. detection of a pedestrian crossing the road initiate a vehicle to slow down or stop. Other actions according to predetermined rules or programmed or derived algorithms also may be performed.

Example 6

Figure 19:
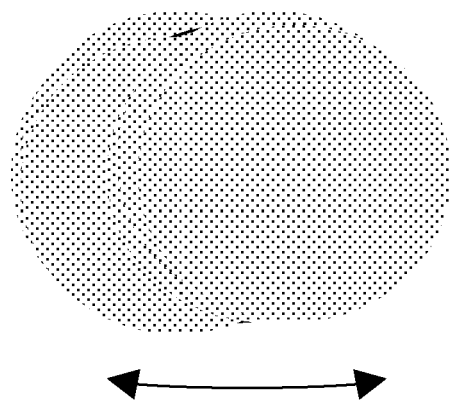
FIG. 19 shows an example of an event of a car moving in a street, which can be detected using a system and/or method according to embodiments of an aspect of the present invention.

Movement of a vehicle in willing to change lane or to start a take over maneuver is another example where embodiments according to the present invention can be applied. Detection or recognition of vehicles in an image can be performed by conventional techniques, as known by the person skilled in the art. Such methods can be easily combined with methods and systems according to the present invention. The image or obtained model can be projected, i.e. after an optional pre-processing stage, and obtained for processing. Such projection may be providing an optical input to the processor, if e.g. a processor with optical input as described in some of the embodiments above is used. The plurality of sensors used may be a plurality of optical sensors. The processing means may be as set out in the previous examples, as well as the quality determination means. A vehicle approaching or moving away will appear as static, while for a vehicle starting to perform a maneuver or change lane, features having dynamic behavior such as variation and oscillation can be detected by spatially and temporally filtering a plurality of parallel processed temporal sensor outputs. The methods and systems as set out in embodiments above thus can be applied for detecting events. Oscillation and/or vibration of parts of the vehicle thus can be derived. By way of illustration, FIG. 19 illustrates a schematic representation of a vehicle whereby oscillation of the vehicle is illustrated, as can be detected using methods and systems according to embodiments of the present invention. A stable centre position as well as an outer left and outer right position of the vehicle is indicated.

It is to be understood that although preferred embodiments, specific constructions and configurations, as well as materials, have been discussed herein for devices according to the present invention, various changes or modifications in form and detail may be made. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method of processing signal outputs of a plurality of topologically distinct sensors in response to mechanical stimuli, the method comprising:
    obtaining a plurality of topologically arranged temporal sensor outputs in parallel,
    extracting features by arithmetic processing in parallel of neighbouring temporal sensor outputs in a topology consistent way based on spatial filtering, the features being identified by a dynamic behaviour pattern, and
    determining a quality of the extracted features.

2. A method according to claim 1, wherein extracting features taking in a topology consistent way comprises arranging the features in a topology maintaining array or arrays.

3. A method according to claim 1, wherein obtaining a plurality of temporal sensor outputs in parallel comprises sampling a plurality of sensor outputs in time to generate the temporal sensor outputs.

4. A method according to claim 1, wherein the temporal sensor outputs are sensor outputs from mechanical sensors or tactile sensors.

5. A method according to claim 1, wherein arithmetic processing comprises processing said neighbouring temporal sensor outputs in the temporal domain.

6. A method according to claim 1, wherein said extracting of features in a topology consistent way comprises recognising the features in sensor outputs and preserving their spatial localisation.

7. A method according to claim 2, the method further comprising spatially filtering or spatio-temporal filtering of the array or arrays.

8. A method according to claim 7, wherein said spatially filtering comprises extraction of an event based on a plurality of neighbouring extracted features in said topology maintaining array or arrays.

9. A method according to claim 1, either or both wherein the arithmetic processing comprises at least one of:
    applying a bandpass, low-pass or high-pass filter or a combination of bandpass, low-pass or high-pass filters for temporal feature extraction,
    using a cellular non-linear network,
    only adding, subtracting, delaying, thresholding, logical or morphological functions, and
    applying a filter having a single filter input signal and resulting in multiple filter output signal, wherein each filter output signal is based on the subtraction of a modified input signal from an original input signal; or
    wherein the arithmetic processing in parallel of neighbouring temporal sensor outputs comprises arithmetic processing in parallel of only part of the neighbouring temporal sensor outputs.

10. A method according to claim 1, wherein the dynamic behaviour comprises any of a variation, vibration or oscillation.

11. A method according to claim 1, wherein said quality of the extracted features comprises a stability of the dynamic behaviour among a plurality of neighbours.

12. A method according to claim 1, wherein the method processes said sensor outputs to improve active or passive perception of events or features occurring in the environment.

13. A method for controlling a computerised system comprising at least one movable element comprising a plurality of topologically distinct sensors, the method comprising;
    measuring a plurality of output signals from said mechanical sensors,
    processing said plurality of output signals using the steps of the method according to of claim 1, and
    controlling said at least one movable element based on said determined quality of the extracted features.

14. A data processor for processing signal outputs of a plurality of topologically distinct sensors in response to mechanical stimuli, the processor comprising:
    an input configured to receive a plurality of topologically arranged temporal sensor outputs in parallel,
    a feature extractor configured to extract features with a dynamical behaviour pattern in a topology consistent way based on spatial filtering, the feature extractor comprising an arithmetic processor configured to perform arithmetic processing in parallel neighbouring temporal samples of the sensor outputs, and
    a determinator configured to determine a quality of the extracted features.

15. A data processor according to claim 14, wherein the input configured to receive a plurality of temporal sensor outputs in parallel comprises a sampler configured to sample a plurality of sensor outputs in time to generate the temporal sensor outputs.

16. A data processor according to claim 14, wherein the arithmetic processor is configured to perform arithmetic processing of said neighbouring temporal sensor outputs in the temporal domain.

17. A data processor according to claim 14, the data processor is configured to arrange the extracted features in a topology maintaining array or arrays, or
    the data processor is configured to recognize features in sensor outputs and preserve their spatial localisation, or
    the data processor is configured to arrange the extracted features in a topology maintaining array or arrays and comprising a filter for spatially or spatio-temporal filtering of the array or arrays.

18. A data processor according to claim 17, wherein the filter is configured to extract an event based on a plurality of neighbouring extracted features in said topology maintaining array or arrays.

19. A data processor according to claim 14, either or both wherein the arithmetic processor comprises at least one of:
    a bandpass filter or a combination of bandpass filters for extracting temporal features,
    a cellular neural network or a cellular non-linear network, a filter based on only substracting, delaying, thresholding, logical or morphological functions, or a filter having a single filter input signal and resulting in multiple filter output signal, wherein each filter output signal is based on the subtraction of a modified input signal from an original input signal; or wherein the arithmetic processor for processing in parallel neighbouring temporal sensor outputs is an arithmetic processor that arithmetically processes in parallel only part of the neighbouring temporal sensor outputs.

20. A data processor according to claim 14, wherein the dynamic behaviour comprises any of a variation, vibration, or oscillation.

21. A data processor according to claim 14, wherein said quality of the extracted features comprises a stability of the dynamic behaviour among a plurality of neighbours.

22. A computerised system comprising at least one movable element comprising a plurality of topologically distinct sensors, and a data processor according to claim 14.

23. A computerised system according to claim 22, the system further comprising a controller for controlling the at least one moveable element as function of the obtained quality of the extracted features.

24. A non-transitory computer program product comprising instructions for processing signal outputs of a plurality of topologically distinct mechanical sensors in response to mechanical stimuli, the computer program product, when executed on a computer, executing the method according to claim 1.

25. A non-transitory machine-readable data storage device storing the computer program product recited in claim 24.

* * * * *